United States Patent
Yasuda et al.

(10) Patent No.: US 12,064,951 B2
(45) Date of Patent: Aug. 20, 2024

(54) CASING MATERIAL FOR POWER STORAGE DEVICE, PRODUCTION METHOD THEREFOR, AND POWER STORAGE DEVICE

(71) Applicant: DAI NIPPON PRINTING CO., LTD., Tokyo (JP)

(72) Inventors: Daisuke Yasuda, Tokyo (JP); Makoto Amano, Tokyo (JP); Takanori Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 771 days.

(21) Appl. No.: 17/287,216

(22) PCT Filed: Oct. 24, 2019

(86) PCT No.: PCT/JP2019/041798
§ 371 (c)(1),
(2) Date: Aug. 24, 2021

(87) PCT Pub. No.: WO2020/085463
PCT Pub. Date: Apr. 30, 2020

(65) Prior Publication Data
US 2022/0115723 A1    Apr. 14, 2022

(30) Foreign Application Priority Data
Oct. 24, 2018 (JP) .................. 2018-200444

(51) Int. Cl.
B32B 7/12      (2006.01)
B32B 27/08     (2006.01)

(52) U.S. Cl.
CPC ............. *B32B 7/12* (2013.01); *B32B 27/08* (2013.01); *B32B 2307/31* (2013.01); *B32B 2307/7265* (2013.01); *B32B 2457/10* (2013.01)

(58) Field of Classification Search
CPC ....... B32B 7/12; B32B 27/08; B32B 2307/31; B32B 2307/7265; B32B 2457/10
(Continued)

(56) References Cited

U.S. PATENT DOCUMENTS

2008/0286635 A1   11/2008   Seino et al.
2015/0255761 A1    9/2015   Hashimoto et al.
(Continued)

FOREIGN PATENT DOCUMENTS

JP   2008-287971 A   11/2008
JP   2017-069203 A    4/2017
(Continued)

OTHER PUBLICATIONS

Dec. 17, 2019 International Search Report issued in International Patent Application No. PCT/JP2019/041798.

*Primary Examiner* — Betelhem Shewareged
(74) *Attorney, Agent, or Firm* — Oliff PLC

(57) ABSTRACT

A casing material for a power storage device, including a laminate that includes, in order, at least a base material layer, a barrier layer, and a heat-fusible resin layer. The heat-fusible resin layer includes a single layer or a plurality of layers. The heat-fusible resin layer includes at least one layer having a hardness of at least 70 MPa from a cross-section in the lamination direction of the laminate, measured using a nanoindentation method using an indentation load of 100 μN.

13 Claims, 9 Drawing Sheets

(58) Field of Classification Search
USPC .......................................................... 428/200
See application file for complete search history.

(56) References Cited

U.S. PATENT DOCUMENTS

| | | | |
|---|---|---|---|
| 2018/0102514 A1* | 4/2018 | Dai | ........................ H01G 11/16 |
| 2018/0331330 A1 | 11/2018 | Amano et al. | |
| 2022/0115723 A1* | 4/2022 | Yasuda | ................... B32B 27/32 |

FOREIGN PATENT DOCUMENTS

| | | |
|---|---|---|
| WO | 2014/050542 A1 | 4/2014 |
| WO | 2017/094724 A1 | 6/2017 |
| WO | 2018/097329 A1 | 5/2018 |

* cited by examiner

CASING MATERIAL FOR POWER STORAGE DEVICE, PRODUCTION METHOD THEREFOR, AND POWER STORAGE DEVICE

TECHNICAL FIELD

The present disclosure relates to a power storage device outer packaging material, a method for producing the power storage device outer packaging material, and a power storage device.

BACKGROUND ART

Various types of power storage devices have been developed heretofore, and in every power storage device, an outer packaging material is an essential member for sealing power storage device elements such as an electrode and an electrolyte. Metallic outer packaging materials have been often used heretofore as power storage device outer packaging materials.

On the other hand, in recent years, power storage devices have been required to be diversified in shape and to be thinned and lightened with improvement of performance of electric cars, hybrid electric cars, personal computers, cameras, mobile phones and so on. However, metallic power storage device outer packaging materials that have often been heretofore used have the disadvantage that it is difficult to keep up with diversification in shape, and there is a limit on weight reduction.

Thus, in recent years, a film-shaped laminate with a base material layer, a barrier layer and a heat-sealable resin layer laminated in this order has been proposed as a power storage device outer packaging material which is easily processed into diversified shapes and is capable of achieving thickness reduction and weight reduction (see, for example, Patent Document 1).

In such a power storage device outer packaging material, generally, a concave portion is formed by cold molding, power storage device elements such as an electrode and an electrolytic solution are disposed in a space formed by the concave portion, and heat-sealable resin layers are heat-sealed to obtain a power storage device with power storage device elements stored in the power storage device outer packaging material.

PRIOR ART DOCUMENT

Patent Document

Patent Document 1: Japanese Patent Laid-open Publication No. 2008-287971

SUMMARY OF THE INVENTION

Problems to be Solved by the Invention

After the power storage device element is sealed with the power storage device outer packaging material, a pressing pressure may be applied to the power storage device for the purpose of, for example, improving adhesion between the active material of the power storage device element and the electrode.

The inventors of the present disclosure have conducted studies, and resultantly found that in conventional power storage device outer packaging materials, a sufficient countermeasure against such a press pressure is not taken, and thus application of a press pressure to the power storage device may cause generation of cracks or the like in the heat-sealable resin layer, leading to deterioration of the insulation quality of the power storage device outer packaging material.

Under these circumstances, a main object of the present disclosure is to provide a power storage device outer packaging material capable of exhibiting high insulation quality even when a press pressure is applied to the power storage device.

Means for Solving the Problem

The inventors of the present disclosure have extensively conducted studies for solving the above-mentioned problems. As a result, it has been found that a power storage device outer packaging material is capable of exhibiting high insulation quality even when a power storage device obtained by sealing a power storage device element with the power storage device outer packaging material. The power storage device outer packaging material includes a laminate including a base material layer, a barrier layer and a heat-sealable resin layer in this order, the heat-sealable resin layer includes a single layer or multiple layers, and the heat-sealable resin layer includes at least one layer having a hardness of 70 MPa or more as measured from a cross-section in a lamination direction of the laminate under a load of indentation of 100 µN in a nanoindentation method.

The present disclosure has been completed by further conducting studies based on the above-mentioned findings. That is, the present disclosure provides an invention of an aspect as described below:

a power storage device outer packaging material which includes a laminate including at least a base material layer, a barrier layer and a heat-sealable resin layer in this order, the heat-sealable resin layer including a single layer or multiple layers, the heat-sealable resin layer including at least one layer having a hardness of 70 MPa or more as measured from a cross-section in a lamination direction of the laminate under a load of indentation of 100 µN in a nanoindentation method.

Advantages of the Invention

According to the present disclosure, it is possible to provide a power storage device outer packaging material which includes a laminate including at least a base material layer, a barrier layer and a heat-sealable resin layer in this order and which is capable of exhibiting high insulation quality even when a press pressure is applied to a power storage device. According to the present disclosure, it is also possible to provide a method for producing the power storage device outer packaging material, and a power storage device.

EMBODIMENTS OF THE INVENTION

A power storage device outer packaging material of the present disclosure includes a laminate including a base material layer, a barrier layer and a heat-sealable resin layer in this order, the heat-sealable resin layer includes a single layer or multiple layers, and the heat-sealable resin layer includes at least one layer having a hardness of 70 MPa or more as measured from a cross-section in a lamination direction of the laminate under a load of indentation of 100 μN in a nanoindentation method. Such a configuration of the power storage device outer packaging material of the present disclosure enables exhibition of high insulation quality even when a press pressure is applied to a power storage device obtained by sealing a power storage device element with the power storage device outer packaging material.

Hereinafter, the power storage device outer packaging material of the present disclosure will be described in detail. In this specification, a numerical range indicated by the term "A to B" means "A or more" and "B or less". For example, the expression of "2 to 15 mm" means 2 mm or more and 15 mm or less.

1. Laminated Structure of Power Storage Device Outer Packaging Material

Figure 1:
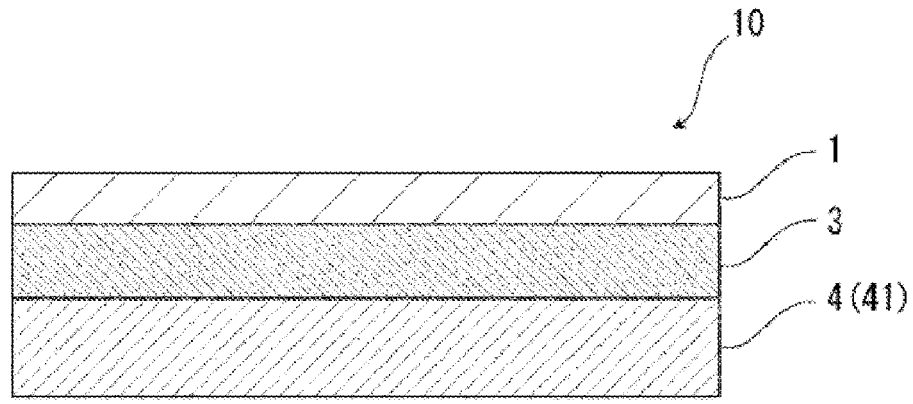
FIG. 1 is a schematic diagram showing an example of a cross-sectional structure of a power storage device outer packaging material of the present disclosure.
Figure 2:
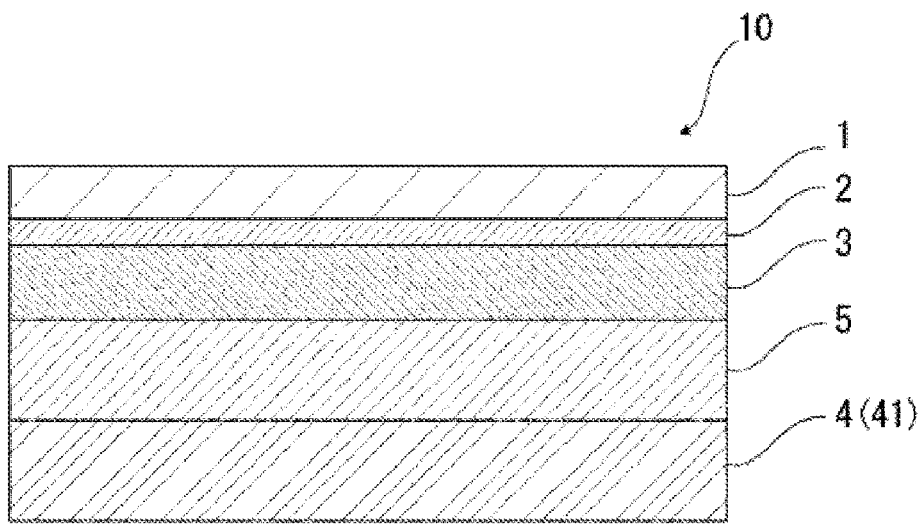
FIG. 2 is a schematic diagram showing an example of a cross-sectional structure of a power storage device outer packaging material of the present disclosure.
Figure 3:
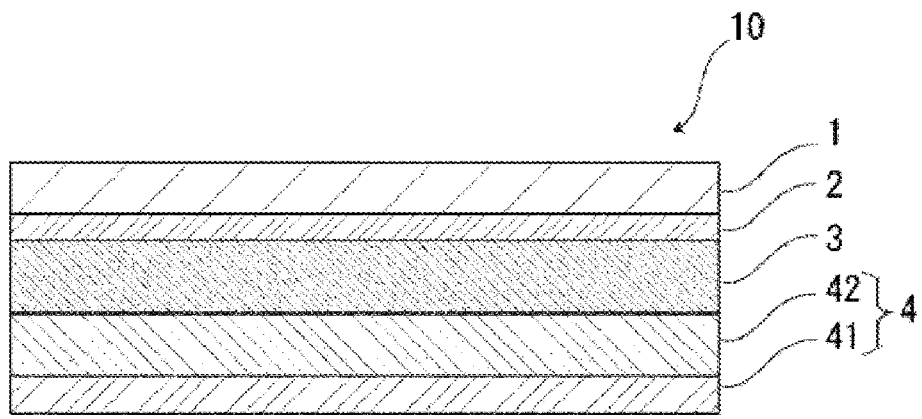
FIG. 3 is a schematic diagram showing an example of a cross-sectional structure of a power storage device outer packaging material of the present disclosure.
Figure 4:
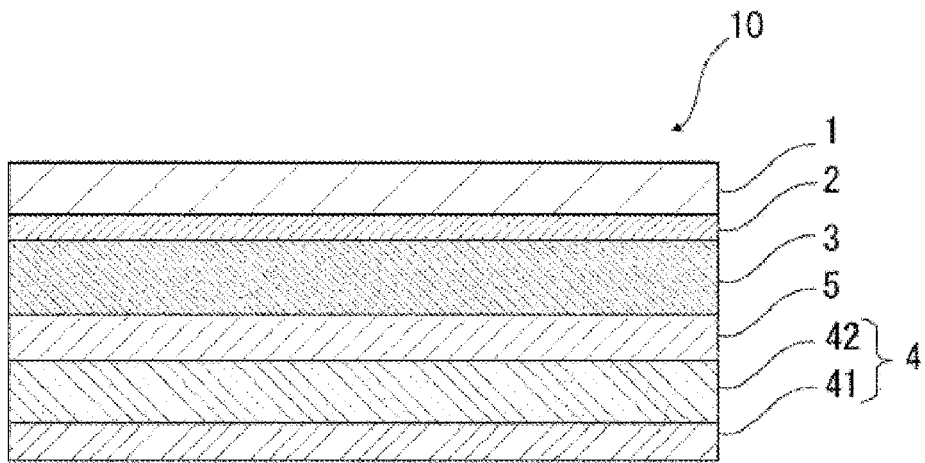
FIG. 4 is a schematic diagram showing an example of a cross-sectional structure of a power storage device outer packaging material of the present disclosure.
Figure 5:
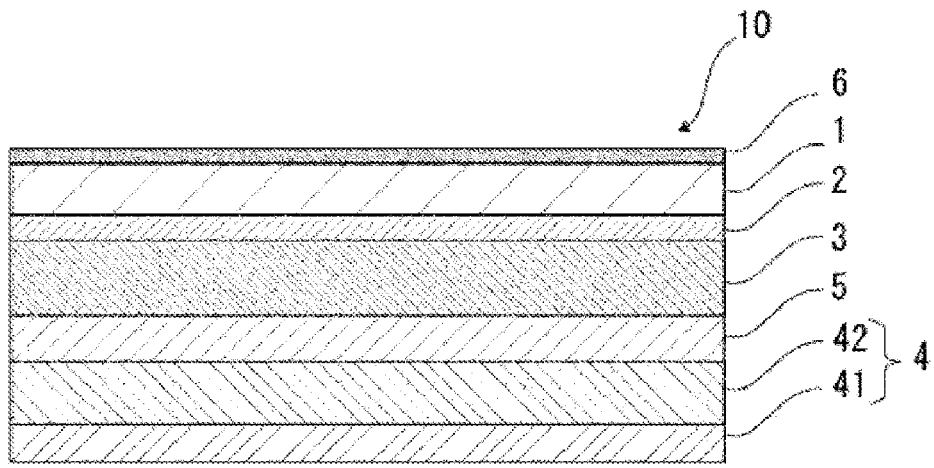
FIG. 5 is a schematic diagram showing an example of a cross-sectional structure of a power storage device outer packaging material of the present disclosure.

For example, as shown in, for example, FIG. 1 to FIG. 5, a power storage device outer packaging material 10 of the present disclosure includes a laminate including at least a base material layer 1, a barrier layer 3 and a heat-sealable resin layer 4 in this order. In the power storage device outer packaging material 10, the base material layer 1 is on the outermost layer side, and the heat-sealable resin layer 4 is an innermost layer. In the power storage device outer packaging material 10 of the present disclosure, the heat-sealable resin layer 4 includes a single layer or multiple layers, and a first heat-sealable resin layer 41 of the heat-sealable resin layer 4 forms an outermost surface of the laminate. FIG. 1 and FIG. 2 show a laminated configuration in which the heat-sealable resin layer 4 includes a single layer of the first heat-sealable resin layer 41, and the first heat-sealable resin layer 41 forms a surface of the laminate. In addition, FIG. 3 to FIG. 5 show a laminated configuration in which the heat-sealable resin layer 4 includes multiple layers (two layers) including the first heat-sealable resin layer 41 and a second heat-sealable resin layer 42, and the first heat-sealable resin layer 41 forms a surface of the laminate. As described later, the heat-sealable resin layer 4 may further include other heat-sealable resin layers such as a third heat-sealable resin layer and a fourth heat-sealable resin layer on the barrier layer 3 side of the second heat-sealable resin layer 42 in addition to the first heat-sealable resin layer 41 and the second heat-sealable resin layer 42.

In construction of the power storage device using the power storage device outer packaging material 10 and power storage device elements, the power storage device elements are put in a space formed by heat-sealing the peripheral portions of the first heat-sealable resin layers 41 of the power storage device outer packaging material 10 which face each other.

As shown in, for example, FIG. 2 to FIG. 5, the power storage device outer packaging material 10 may have an adhesive agent layer 2 between the base material layer 1 and the barrier layer 3 if necessary for the purpose of, for example, improving bondability between these layers. As shown in, for example, FIG. 2, FIG. 4 and FIG. 5, an adhesive layer 5 may be present between the barrier layer 3 and the heat-sealable resin layer 4 if necessary for the purpose of, for example, improving bondability between these layers. As shown in FIG. 5, a surface coating layer 6 or the like may be provided outside the base material layer 1 (on a side opposite to the heat-sealable resin layer 4 side).

The thickness of the laminate forming the power storage device outer packaging material 10 is not particularly limited, and is preferably about 180 μm or less or about 155 μm or less from the viewpoint of cost reduction, improvement of the energy density, and the like, and preferably about 35 μm or more, about 45 μm or more, or about 60 μm or more from the viewpoint of maintaining the function of the power storage device outer packaging material, which is protection of the power storage device elements. The thickness of the laminate is preferably in the range of, for example, about 35 to 180 μm, about 35 to 155 μm, about 45 to 180 μm, about 45 to 155 μm, about 60 to 180 μm, or about 60 to 155 μm.

2. Layers Forming Power Storage Device Outer Packaging Material

[Base Material Layer 1]

In the present disclosure, the base material layer 1 is a layer provided for the purpose of, for example, exhibiting a function as a base material of the power storage device outer packaging material. The base material layer 1 is located on the outer layer side of the power storage device outer packaging material.

The material that forms the base material layer 1 is not particularly limited as long as it has a function as a base material, i.e. at least insulation quality. The base material layer 1 can be formed using, for example, a resin, and the resin may contain additives described later.

When the base material layer 1 is formed of a resin, the base material layer 1 may be, for example, a resin film formed of a resin, or may be formed by applying a resin. The resin film may be an unstretched film or a stretched film. Examples of the stretched film include uniaxially stretched films and biaxially stretched films, and biaxially stretched films are preferable. Examples of the stretching method for forming a biaxially stretched film include a sequential biaxial stretching method, an inflation method, and a simultaneous biaxial stretching method. Examples of the method for applying a resin include a roll coating method, a gravure coating method and an extrusion coating method.

Examples of the resin that forms the base material layer 1 include resins such as polyester, polyamide, polyolefin, epoxy resin, acrylic resin, fluororesin, polyurethane, silicone resin and phenol resin, and modified products of these resins. The resin that forms the base material layer 1 may be a copolymer of these resins or a modified product of the copolymer. Further, a mixture of these resins may be used.

Of these resins, polyester and polyamide are preferable as resins that form the base material layer 1.

Specific examples of the polyester resin include polyethylene terephthalate, polybutylene terephthalate, polyethylene naphthalate, polybutylene naphthalate, polyethylene isophthalate and copolyester. Examples of the copolyester include copolyesters having ethylene terephthalate as a main repeating unit. Specific examples thereof include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene (terephthalate/decane dicarboxylate). These polyesters may be used alone, or may be used in combination of two or more thereof.

Specific examples of the polyamide include polyamides such as aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polyamide MXD6 (polymethaxylylene adipamide); cycloaliphatic polyamides such as polyamide PACM6 (polybis(4-aminocyclohexyl)methaneadipamide; polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

The base material layer 1 contains preferably at least one of a polyester film, a polyamide film and a polyolefin film, preferably at least one of a stretched polyester film, a stretched polyamide film and a stretched polyolefin film, still more preferably at least one of a stretched polyethylene terephthalate film, a stretched polybutylene terephthalate film, a stretched nylon film and a stretched polypropylene film, even more preferably at least one of a biaxially stretched polyethylene terephthalate film, a biaxially stretched polybutylene terephthalate film, a biaxially stretched nylon film, and a biaxially stretched polypropylene film.

The base material layer 1 may be a single layer, or may include two or more layers. When the base material layer 1 includes two or more layers, the base material layer 1 may be a laminate obtained by laminating resin films with an adhesive or the like, or a resin film laminate obtained by co-extruding resins to form two or more layers. The resin film laminate obtained by co-extruding resins to form two or more layers may be used as the base material layer 1 in an unstretched state, or may be uniaxially stretched or biaxially stretched and used as the base material layer 1.

Specific examples of the resin film laminate with two or more layers in the base material layer 1 include laminates of a polyester film and a nylon film, nylon film laminates with two or more layers, and polyester film laminates with two or more layers. Laminates of a stretched nylon film and a stretched polyester film, stretched nylon film laminates with two or more layers, and stretched polyester film laminates with two or more layers are preferable. For example, when the base material layer 1 is a resin film laminate with two layers, the base material layer 1 is preferably a laminate of a polyester resin film and a polyester resin film, a laminate of a polyamide resin film and a polyamide resin film, or a laminate of a polyester resin film and a polyamide resin film, more preferably a laminate of a polyethylene terephthalate film and a polyethylene terephthalate film, a laminate of a nylon film and a nylon film, or a laminate of a polyethylene terephthalate film and a nylon film. Since the polyester resin is hardly discolored even in the case where for example, an electrolytic solution is deposited on the surface, it is preferable that the polyester resin film is located at the outermost layer of the base material layer 1 when the base material layer 1 is a resin film laminate with two or more layers.

When the base material layer 1 is a resin film laminate with two or more layers, the two or more resin films may be laminated with an adhesive interposed therebetween. Specific examples of the preferred adhesive include the same adhesives as those exemplified for the adhesive agent layer 2 described later. The method for laminating a resin film having two or more layers is not particularly limited, and a known method can be employed. Examples thereof include a dry lamination method, a sand lamination method, an extrusion lamination method and a thermal lamination method, and a dry lamination method is preferable. When the resin film is laminated by a dry lamination method, it is preferable to use a polyurethane adhesive as the adhesive layer. Here, the thickness of the adhesive is, for example, about 2 to 5 µm. In addition, the lamination may be performed with an anchor coat layer formed on the resin film. Examples of the anchor coat layer include the same adhesives as those exemplified for the adhesive agent layer 2 described later. Here, the thickness of the anchor coat layer is, for example, about 0.01 to 1.0 µm.

Additives such as a lubricant, a flame retardant, an antiblocking agent, an antioxidant, a light stabilizer, a tackifier and an antistatic agent may be present on the surface of the base material layer 1 and/or inside the base material layer 1. The additives may be used alone, or may be used in combination of two or more thereof.

In the present disclosure, it is preferable that a lubricant is present on the surface of the base material layer 1 from the viewpoint of enhancing the moldability of the power storage device outer packaging material. The lubricant is not particularly limited, and is preferably an amide-based lubricant. Specific examples of the amide-based lubricant include saturated fatty acid amides, unsaturated fatty acid amides, substituted amides, methylol amides, saturated fatty acid bisamides, unsaturated fatty acid bisamides, fatty acid ester amides an aromatic bisamides. Specific examples of the saturated fatty acid amide include lauric acid amide, palmitic acid amide, stearic acid amide, behenic acid amide, and hydroxystearic acid amide. Specific examples of unsaturated fatty acid amide include oleic acid amide and erucic acid amide. Specific examples of the substituted amide include N-oleylpalmitic acid amide, N-stearyl stearic acid amide, N-stearyl oleic acid amide, N-oleyl stearic acid amide and N-stearyl erucic acid amide. Specific examples of the methylolamide include methylolstearic acid amide. Specific examples of the saturated fatty acid bisamide include methylenebisstearic acid amide, ethylenebiscapric acid amide, ethylenebislauric acid amide, ethylenebisstearic acid amide, ethylenebishydroxystearic acid amide, ethylenebisbehenic acid amide, hexamethylenebisstearic acid amide, hexamethylenehydroxystearic acid amide, N,N'-distearyl adipic acid amide and N,N'-distearyl sebacic acid amide. Specific examples of the unsaturated fatty acid bisamide include ethylenebisoleic acid amide, ethylenebiserucic acid amide, hexamethylenebisoleic acid amide, N,N'-dioleyladipic acid amide and N,N'-dioleylsebacic acid amide. Specific examples of the fatty acid ester amide include stearoamide-ethyl stearate. Specific examples of the aromatic bisamide include m-xylylenebisstearic acid amide, m-xylylenebishydroxystearic acid amide and N,N'-distearylisophthalic acid amide. The lubricants may be used alone, or may be used in combination of two or more thereof.

When the lubricant is present on the surface of the base material layer 1, the amount of the lubricant present is not particularly limited, and is preferably about 3 mg/m$^2$ or more, more preferably about 4 to 15 mg/m$^2$, still more preferably about 5 to 14 mg/m$^2$.

The lubricant present on the surface of the base material layer 1 may be one obtained by exuding the lubricant contained in the resin forming the base material layer 1, or one obtained by applying the lubricant to the surface of the base material layer 1.

The thickness of the base material layer 1 is not particularly limited as long as a function as a base material is performed, and the thickness of the base material layer 1 is, for example, about 3 to 50 μm, preferably about 10 to 35 μm. When the base material layer 1 is a resin film laminate with two or more layers, the thickness of the resin film forming each layer is, for example, 2 to 35 μm, preferably about 2 to 25 μm.

[Adhesive Agent Layer 2]

In the power storage device outer packaging material of the present disclosure, the adhesive agent layer 2 is a layer provided between the base material layer 1 and the barrier layer 3 if necessary for the purpose of enhancing bondability between these layers.

The adhesive agent layer 2 is formed from an adhesive capable of bonding the base material layer 1 and the barrier layer 3. The adhesive used for forming the adhesive agent layer 2 is not limited, and may be any of a chemical reaction type, a solvent volatilization type, a heat melting type, a heat pressing type, and the like. The adhesive agent may be a two-liquid curable adhesive (two-liquid adhesive), a one-liquid curable adhesive (one-liquid adhesive), or a resin that does not involve curing reaction. The adhesive agent layer 2 may be a single layer or a multi-layer.

Specific examples of the adhesive component contained in the adhesive include polyester resins such as polyethylene terephthalate, polybutylene terephthalate, polyethylene naphthalate, polybutylene naphthalate, polyethylene isophthalate and copolyester; polyether; polyurethane; epoxy resins; phenol resins; polyamides such as nylon 6, nylon 66, nylon 12 and copolymerized polyamide; polyolefin-based resins such as polyolefins, cyclic polyolefins, acid-modified polyolefins and acid-modified cyclic polyolefins; cellulose; (meth)acrylic resins; polyimide; polycarbonate; amino resins such as urea resins and melamine resins; rubbers such as chloroprene rubber, nitrile rubber and styrene-butadiene rubber; and silicone resins. These adhesive components may be used alone, or may be used in combination of two or more thereof. Of these adhesive components, polyurethane-based adhesives are preferable. In addition, the adhesive strength of these resins used as adhesive components can be increased by using an appropriate curing agent in combination. As the curing agent, appropriate one is selected from polyisocyanate, a polyfunctional epoxy resin, an oxazoline group-containing polymer, a polyamine resin, an acid anhydride and the like according to the functional group of the adhesive component.

Examples of the polyurethane adhesive include polyurethane adhesives containing a main agent containing a polyol compound and a curing agent containing an isocyanate compound. The polyurethane adhesive is preferably a two-liquid curable polyurethane adhesive having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound. Since the adhesive agent layer 2 is formed of a polyurethane adhesive, excellent electrolytic solution resistance is imparted to the power storage device outer packaging material, so that peeling of the base material layer 1 is suppressed even if the electrolytic solution is deposited on the side surface.

Other components may be added to the adhesive agent layer 2 as long as bondability is not inhibited, and the adhesive agent layer 2 may contain a colorant, a thermoplastic elastomer, a tackifier, a filler and the like. When the adhesive agent layer 2 contains a colorant, the power storage device outer packaging material can be colored. As the colorant, known colorants such as pigments and dyes can be used. The colorants may be used alone, or may be used in combination of two or more thereof.

The type of pigment is not particularly limited as long as the bondability of the adhesive agent layer 2 is not impaired. Examples of the organic pigment include azo-based pigments, phthalocyanine-based pigments, quinacridone-based pigments, anthraquinone-based pigments, dioxazine-based pigments, indigothioindigo-based pigments, perinone-perylene-based pigments, isoindolenine-based pigments and benzimidazolone-based pigments. Examples of the inorganic pigment include carbon black-based pigments, titanium oxide-based pigments, cadmium-based pigments, lead-based pigments, chromium-based pigments and iron-based pigments, and also fine powder of mica (mica) and fish scale foil.

Of the colorants, carbon black is preferable for the purpose of, for example, blackening the appearance of the power storage device outer packaging material.

The average particle diameter of the pigment is not particularly limited, and is, for example, about 0.05 to 5 μm, preferably about 0.08 to 2 μm. The average particle size of the pigment is a median diameter measured by a laser diffraction/scattering particle size distribution measuring apparatus.

The content of the pigment in the adhesive agent layer 2 is not particularly limited as long as the power storage device outer packaging material is colored, and the content is, for example, about 5 to 60 mass %, preferably 10 to 40 mass %.

The thickness of the adhesive agent layer 2 is not particularly limited as long as the base material layer 1 and the barrier layer 3 can be bonded to each other, and for example, the thickness is about 1 μm or more, or about 2 μm or more, and about 10 μm or less, or about 5 μm or less, and is preferably in the range of about 1 to 10 μm, about 1 to 5 μm, about 2 to 10 μm, or about 2 to 5 μm.

[Colored Layer]

The colored layer is a layer provided between the base material layer 1 and the barrier layer 3 if necessary (not shown). When the adhesive agent layer 2 is present, the colored layer may be provided between the base material layer 1 and the adhesive agent layer 2 or between the adhesive agent layer 2 and the barrier layer 3. The colored layer may be provided outside the base material layer 1. By providing the colored layer, the power storage device outer packaging material can be colored.

The colored layer can be formed by, for example, applying an ink containing a colorant to the surface of the base material layer 1, the surface of the adhesive agent layer 2, or the surface of the barrier layer 3. As the colorant, known colorants such as pigments and dyes can be used. The colorants may be used alone, or may be used in combination of two or more thereof.

Specific examples of the colorant contained in the colored layer include the same colorants as those described in the section [Adhesive agent Layer 2].

[Barrier Layer 3]

In the power storage device outer packaging material, the barrier layer 3 is a layer which suppresses at least ingress of moisture.

Examples of the barrier layer 3 include metal foils, deposited films and resin layers having a barrier property. Examples of the deposited film include metal deposited films, inorganic oxide deposited films and carbon-containing inorganic oxide deposited films, and examples of the resin layer include those of polyvinylidene chloride, fluorine-containing resins such as polymers containing chlorotrifluoroethylene (CTFE) as a main component, polymers containing tetrafluoroethylene (TFE) as a main component, polymers having a fluoroalkyl group, and polymers containing a fluoroalkyl unit as a main component, and ethylene vinyl alcohol copolymers. Examples of the barrier layer 3 include resin films provided with at least one of these deposited films and resin layers. A plurality of barrier layers 3 may be provided. Preferably, the barrier layer 3 contains a layer formed of a metal material. Specific examples of the metal material forming the barrier layer 3 include aluminum alloys, stainless steel, titanium steel and steel sheets. When the metal material is used as a metal foil, it is preferable that the metal material includes at least one of an aluminum alloy foil and a stainless steel foil.

The aluminum alloy is more preferably a soft aluminum alloy foil formed of, for example, an annealed aluminum alloy from the viewpoint of improving the moldability of the power storage device outer packaging material, and is preferably an aluminum alloy foil containing iron from the viewpoint of further improving the moldability. In the aluminum alloy foil containing iron (100 mass %), the content of iron is preferably 0.1 to 9.0 mass %, more preferably 0.5 to 2.0 mass %. When the content of iron is 0.1 mass % or more, it is possible to obtain a power storage device outer packaging material having more excellent moldability. When the content of iron is 9.0 mass % or less, it is possible to obtain a power storage device outer packaging material more excellent in flexibility. Examples of the soft aluminum alloy foil include aluminum alloy foils having a composition specified in JIS H4160: 1994 A8021H-O, JIS H4160: 1994 A8079H-O, JIS H4000: 2014 A8021P-O, or JIS H4000: 2014 A8079P-O. If necessary, silicon, magnesium, copper, manganese or the like may be added. Softening can be performed by annealing or the like.

Examples of the stainless steel foil include austenitic stainless steel foils, ferritic stainless steel foils, austenitic/ferritic stainless steel foils, martensitic stainless steel foils and precipitation-hardened stainless steel foils. From the viewpoint of providing a power storage device outer packaging material further excellent in moldability, it is preferable that the stainless steel foil is formed of austenitic stainless steel.

Specific examples of the austenite-based stainless steel foil include SUS 304 stainless steel, SUS 301 stainless steel and SUS 316L stainless steel, and of these, SUS 304 stainless steel is especially preferable.

When the barrier layer 3 is a metal foil, the barrier layer 3 may perform a function as a barrier layer suppressing at least ingress of moisture, and has a thickness of, for example, about 9 to 200 μm. For example, the thickness of the barrier layer 3 is preferably about 85 μm or less, more preferably about 50 μm or less, still more preferably about 40 μm or less, especially preferably about 35 μm or less, and preferably about 10 μm or more, more preferably about 20 μm or more, still more preferably about 25 μm or more. The thickness is preferably in the range of about 10 to 85 μm, about 10 to 50 μm, about 10 to 40 μm, about 10 to 35 μm, about 20 to 85 μm, about 20 to 50 μm, about 20 to 40 μm, about 20 to 35 μm, about 25 to 85 μm, about 25 to 50 μm, about 25 to 40 μm, or about 25 to 35 μm. When the barrier layer 3 is formed of an aluminum alloy foil, the thickness thereof is especially preferably in above-described range. Particularly, when the barrier layer 3 is formed of a stainless steel foil, the thickness of the stainless steel foil is preferably about 60 μm or less, more preferably about 50 μm or less, still more preferably about 40 μm or less, even more preferably about 30 μm or less, especially preferably about 25 μm or less, and preferably about 10 μm or more, more preferably about 15 μm or more. The thickness is about preferably in the range of about 10 to 60 μm, about 10 to 50 μm, about 10 to 40 μm, about 10 to 30 μm, about 10 to 25 μm, about 15 to 60 μm, about 15 to 50 μm, about 15 to 40 μm, about 15 to 30 μm, or about 15 to 25 μm.

When the barrier layer 3 is a metal foil, it is preferable that a corrosion-resistant film is provided at least on a surface on a side opposite to the base material layer for preventing dissolution and corrosion. The barrier layer 3 may include a corrosion-resistant film on each of both surfaces. Here, the corrosion-resistant film refers to a thin film obtained by subjecting the surface of the barrier layer to, for example, hydrothermal denaturation treatment such as boehmite treatment, chemical conversion treatment, anodization treatment, plating treatment with nickel, chromium or the like, or corrosion prevention treatment by applying a coating agent to impart corrosion resistance (e.g. acid resistance and alkali resistance) to the barrier layer. Specifically, the corrosion-resistant film means a film which improves the acid resistance of the barrier layer (acid-resistant film), a film which improves the alkali resistance of the barrier layer (alkali-resistant film), or the like. One of treatments for forming the corrosion-resistant film may be performed, or two or more thereof may be performed in combination. In addition, not only one layer but also multiple layers can be formed. Further, of these treatments, the hydrothermal denaturation treatment and the anodization treatment are treatments in which the surface of the metal foil is dissolved with a treatment agent to form a metal compound excellent in corrosion resistance. The definition of the chemical conversion treatment may include these treatments. When the barrier layer 3 is provided with the corrosion-resistant film, the barrier layer 3 is regarded as including the corrosion-resistant film.

The corrosion-resistant film exhibits the effects of preventing delamination between the barrier layer (e.g. an aluminum alloy foil) and the base material layer during molding of the power storage device outer packaging material; preventing dissolution and corrosion of the surface of the barrier layer, particularly dissolution and corrosion of aluminum oxide present on the surface of the barrier layer when the barrier layer is an aluminum alloy foil, by hydrogen fluoride generated by reaction of an electrolyte with moisture; improving the bondability (wettability) of the surface of the barrier layer; preventing delamination between the base material layer and the barrier layer during heat-sealing; and preventing delamination between the base material layer and the barrier layer during molding.

Various corrosion resistant films formed by chemical conversion treatment are known, and examples thereof include mainly corrosion resistant films containing at least one of a phosphate, a chromate, a fluoride, a triazine thiol compound and a rare earth oxide. Examples of the chemical conversion treatment using a phosphate or a chromate include chromic acid chromate treatment, phosphoric acid chromate treatment, phosphoric acid-chromate treatment and chromate treatment, and examples of the chromium compound used in these treatments include chromium nitrate, chromium fluoride, chromium sulfate, chromium acetate, chromium oxalate, chromium biphosphate, acetylacetate chromate, chromium chloride and chromium potassium sulfate. Examples of the phosphorus compound used in these treatments include sodium phosphate, potassium phosphate, ammonium phosphate and polyphosphoric acid. Examples of the chromate treatment include etching chromate treatment, electrolytic chromate treatment and coating-type chromate treatment, and coating-type chromate treatment is preferable. This coating-type chromate treatment is treatment in which at least a surface of the barrier layer (e.g. an aluminum alloy foil) on the inner layer side is first degreased by a well-known treatment method such as an alkali immersion method, an electrolytic cleaning method, an acid cleaning method, an electrolytic acid cleaning method or an acid activation method, and a treatment solution containing a metal phosphate such as Cr (chromium) phosphate, Ti (titanium) phosphate, Zr (zirconium) phosphate or Zn (zinc) phosphate or a mixture of these metal salts as a main component, a treatment solution containing any of non-metal salts of phosphoric acid and a mixture of these non-metal salts as a main component, or a treatment solution formed of a mixture of any of these salts and a synthetic resin or the like is then applied to the degreased surface by a well-known coating method such as a roll coating method, a gravure printing method or an immersion method, and dried. As the treatment liquid, for example, various solvents such as water, an alcohol-based solvent, a hydrocarbon-based solvent, a ketone-based solvent, an ester-based solvent, and an ether-based solvent can be used, and water is preferable. Examples of the resin component used here include polymers such as phenol-based resins and acryl-based resins, and examples of the treatment include chromate treatment using an aminated phenol polymer having any of repeating units represented by the following general formulae (1) to (4). In the aminated phenol polymer, the repeating units represented by the following general formulae (1) to (4) may be contained alone, or may be contained in combination of two or more thereof. The acryl-based resin is preferably polyacrylic acid, an acrylic acid-methacrylic acid ester copolymer, an acrylic acid-maleic acid copolymer, an acrylic acid-styrene copolymer, or a derivative thereof such as a sodium salt, an ammonium salt or an amine salt thereof. In particular, a derivative of polyacrylic acid such as an ammonium salt, a sodium salt or an amine salt of polyacrylic acid is preferable. In the present disclosure, the polyacrylic acid means a polymer of acrylic acid. The acryl-based resin is also preferably a copolymer of acrylic acid and dicarboxylic acid or dicarboxylic anhydride, and is also preferably an ammonium salt, a sodium salt or an amine salt of a copolymer of acrylic acid and dicarboxylic acid or dicarboxylic anhydride. The acryl-based resins may be used alone, or may be used in combination of two or more thereof.

[Chemical Formula 1]

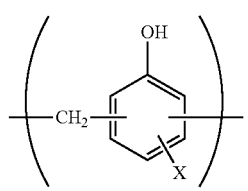

(1)

[Chemical Formula 2]

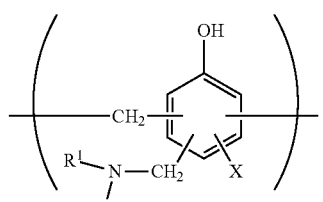

(2)

[Chemical Formula 3]

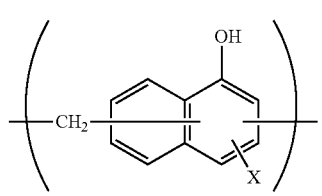

(3)

[Chemical Formula 4]

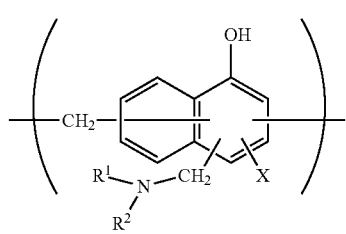

(4)

In the general formulae (1) to (4), X represents a hydrogen atom, a hydroxy group, an alkyl group, a hydroxyalkyl group, an allyl group or a benzyl group. $R^1$ and $R^2$ are the same or different, and each represents a hydroxy group, an alkyl group or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxy group or a hydroxyalkyl group. A number average molecular weight of the aminated phenol polymer having repeating units represented by the general formulae (1) to (4) is preferably 500 or more and 1,000,000 or less, and more preferably about 1,000 or more and 20,000 or less, for example. The aminated phenol polymer is produced by, for example, performing polycondensation of a phenol compound or a naphthol compound with formaldehyde to prepare a polymer including repeating units represented by the general formula (1) or the general formula (3), and then introducing a functional group ($—CH_2NR^1R^2$) into the obtained polymer using formaldehyde and an amine ($R^1R^2NH$). The aminated phenol polymers are used alone, or used in combination of two or more thereof.

Other examples of the corrosion-resistant film include thin films formed by corrosion prevention treatment of coating type in which a coating agent containing at least one selected from the group consisting of a rare earth element oxide sol, an anionic polymer and a cationic polymer is applied. The coating agent may further contain phosphoric acid or a phosphate, and a crosslinker for crosslinking the polymer. In the rare earth element oxide sol, fine particles of a rare earth element oxide (e.g. particles having an average particle diameter of 100 nm or less) are dispersed in a liquid dispersion medium. Examples of the rare earth element oxide include cerium oxide, yttrium oxide, neodymium oxide and lanthanum oxide, and cerium oxide is preferable from the viewpoint of further improving adhesion. The rare earth element oxides contained in the corrosion-resistant film can be used alone, or used in combination of two or more thereof. As the liquid dispersion medium for the rare earth element oxide, for example, various solvents such as water, an alcohol-based solvent, a hydrocarbon-based solvent, a ketone-based solvent, an ester-based solvent, and an ether-based solvent can be used, and water is preferable. For example, the cationic polymer is preferably polyethyleneimine, an ion polymer complex formed of a polymer having polyethyleneimine and a carboxylic acid, primary amine-grafted acrylic resins obtained by graft-polymerizing a primary amine with an acrylic main backbone, polyallylamine or a derivative thereof, or aminated phenol. The anionic polymer is preferably poly (meth)acrylic acid or a salt thereof, or a copolymer containing (meth)acrylic acid or a salt thereof as a main component. The crosslinker is preferably at least one selected from the group consisting of a silane coupling agent and a compound having any of functional groups including an isocyanate group, a glycidyl group, a carboxyl group and an oxazoline group. In addition, the phosphoric acid or phosphate is preferably condensed phosphoric acid or a condensed phosphate.

Examples of the corrosion-resistant film include films formed by applying a dispersion of fine particles of a metal oxide such as aluminum oxide, titanium oxide, cerium oxide or tin oxide or barium sulfate in phosphoric acid to the surface of the barrier layer and performing baking treatment at 150° C. or higher.

The corrosion resistance film may have a laminated structure in which at least one of a cationic polymer and an anionic polymer is further laminated if necessary. Examples of the cationic polymer and the anionic polymer include those described above.

The composition of the corrosion-resistant film can be analyzed by, for example, time-of-flight secondary ion mass spectrometry.

The amount of the corrosion-resistant film to be formed on the surface of the barrier layer 3 in the chemical conversion treatment is not particularly limited, but for example when the coating-type chromate treatment is performed, and it is desirable that the chromic acid compound be contained in an amount of, for example, about 0.5 to 50 mg, preferably about 1.0 mg to 40 mg, in terms of chromium, the phosphorus compound be contained in an amount of, for example, about 0.5 to 50 mg, preferably about 1.0 to 40 mg, in terms of phosphorus, and the aminated phenol polymer be contained in an amount of, for example, about 1.0 to 200 mg, preferably about 5.0 mg to 150 mg, per 1 $m^2$ of the surface of the barrier layer 3.

The thickness of the corrosion-resistant film is not particularly limited, and is preferably about 1 nm to 20 μm, more preferably about 1 nm to 100 nm, still more preferably about 1 nm to 50 nm from the viewpoint of the cohesive force of the film and the adhesive strength with the barrier layer and the heat-sealable resin layer. The thickness of the corrosion-resistant film can be measured by observation with a transmission electron microscope or a combination of observation with a transmission electron microscope and energy dispersive X-ray spectroscopy or electron beam energy loss spectroscopy. By analyzing the composition of the corrosion-resistant film using time-of-flight secondary ion mass spectrometry, peaks derived from secondary ions from, for example, Ce, P and O (e.g. at least one of $Ce_2PO_4^+$, $CePO_4^-$ and the like) and secondary ions from, for example, Cr, P and O (e.g. at least one of $CrPO_2^+$, $CrPO_4^-$ and the like) are detected.

The chemical conversion treatment is performed in the following manner: a solution containing a compound to be used for formation of a corrosion-resistant film is applied to the surface of the barrier layer by a bar coating method, a roll coating method, a gravure coating method, an immersion method or the like, and heating is then performed so that the temperature of the barrier layer is about 70 to 200° C. or less. The barrier layer may be subjected to a degreasing treatment by an alkali immersion method, an electrolytic cleaning method, an acid cleaning method, an electrolytic acid cleaning method or the like before the barrier layer is subjected to a chemical conversion treatment. When a degreasing treatment is performed as described above, the chemical conversion treatment of the surface of the barrier layer can be further efficiently performed. When an acid degreasing agent with a fluorine-containing compound dissolved in an inorganic acid is used for degreasing treatment, not only a metal foil degreasing effect can be obtained but also a metal fluoride can be formed, and in this case, only degreasing treatment may be performed.

[Heat-Sealable Resin Layer 4]

In the power storage device outer packaging material of the present disclosure, the heat-sealable resin layer 4 is a layer (sealant layer) which corresponds to an innermost layer and performs a function of hermetically sealing the power storage device element by heat-sealing the heat-sealable resin layer during construction of the power storage device. In the power storage device outer packaging material 10 of the present disclosure, the heat-sealable resin layer 4 includes a single layer or multiple layers, and a first heat-sealable resin layer 41 of the heat-sealable resin layer 4 forms a surface of the laminate. Therefore, during construction of the power storage device, the first heat-sealable resin layer 41 is heat-sealed to hermetically seal the power storage device element.

When the heat-sealable resin layer 4 includes a single layer, the heat-sealable resin layer 4 forms the first heat-sealable resin layer 41. FIG. 1 and FIG. 2 show a laminated configuration in which the heat-sealable resin layer 4 includes a single layer of the first heat-sealable resin layer 41, and the first heat-sealable resin layer 41 forms a surface of the laminate.

When the heat-sealable resin layer 4 includes multiple layers, at least the first heat-sealable resin layer 41 and the second heat-sealable resin layer 42 are provided in this order from the surface side of the laminate forming the power storage device outer packaging material 10. FIG. 3 to FIG. 5 show a laminated configuration in which the heat-sealable resin layer 4 includes multiple layers (two layers) including the first heat-sealable resin layer 41 and the second heat-sealable resin layer 42, and the first heat-sealable resin layer 41 forms a surface of the laminate.

When the heat-sealable resin layer 4 includes multiple layers, the heat-sealable resin layer 4 may further include a third heat-sealable resin layer, a fourth heat-sealable resin layer and the like on the barrier layer 3 side of the second heat-sealable resin layer 42 in addition to the first heat-sealable resin layer 41 and the second heat-sealable resin layer 42. When the heat-sealable resin layer 4 includes multiple layers, it is preferable that the heat-sealable resin layer 4 includes two layers including the first heat-sealable resin layer 41 and the second heat-sealable resin layer 42.

In the power storage device outer packaging material of the present disclosure, the heat-sealable resin layer includes at least one layer having a hardness of 70 MPa or more as measured from a cross-section in a lamination direction of the laminate under a load of indentation of 100 µN in a nanoindentation method. In the power storage device outer packaging material of the present disclosure, the hardness is 70 MPa, and therefore high insulation quality can be exhibited even when a press pressure is applied to a power storage device using the power storage device outer packaging material.

From the viewpoint of further enhancing insulation quality, the hardness is preferably 100 MPa or more, more preferably 120 MPa or more, still more preferably 160 MPa or more, and preferably 300 MPa or less, more preferably 250 MPa or less, still more preferably 200 MPa or less, and is preferably in the range of about 70 to 300 MPa, about 70 to 250 MPa, about 70 to 200 MPa, about 100 to 300 MPa, about 100 to 250 MPa, about 100 to 200 MPa, about 120 to 300 MPa, about 120 to 250 MPa, about 120 to 200 MPa, about 160 to 300 MPa, about 160 to 250 MPa, or about 160 to 200 MPa.

It is preferable that at least one of the first heat-sealable resin layer 41 and the second heat-sealable resin layer 42 in the heat-sealable resin layer 4 satisfies the hardness. When the heat-sealable resin layer 4 is a single layer having only the first heat-sealable resin layer 41, the hardness is the hardness of the first heat-sealable resin layer 41. When the heat-sealable resin layer 4 has the second heat-sealable resin layer 42, it is preferable that at least one of the first heat-sealable resin layer 41 and the second heat-sealable resin layer 42 has the hardness, and it is more preferable that both the first heat-sealable resin layer 41 and the second heat-sealable resin layer 42 have the hardness. When the heat-sealable resin layer 4 has the second heat-sealable resin layer 42, the hardness of the second heat-sealable resin layer 42 is preferably higher than that of the first heat-sealable resin layer 41.

The hardness of the heat-sealable resin layer 4 can be adjusted by, for example, the molecular weight, the melting point, the softening point, the molecular weight distribution, the crystallinity and the like of the resin forming the layer having the hardness.

Measurement of the hardness of the heat-sealable resin layer by an indentation method is performed as follows. The hardness is measured using a nanoindenter (TriboIndenter TI 950 manufactured by HYSITRON, Inc.). In the nanoindenter, a regular triangular pyramid-shaped indenter (TI-0039 manufactured by HYSITRON, Inc.) (Berkovich type) having a diamond chip at the tip thereof is used. At room temperature (25° C.), each power storage device outer packaging material is cut in the lamination direction to expose a cross-section of the heat-sealable resin layer. Next, using the nanoindenter, the hardness is measured at the time of perpendicularly pressing the indenter into a cross-section of a layer to be measured in the heat-sealable resin layer. As measurement conditions, a load control method is used, and the pressing load is constant at 100 µN (the applied load is increased from 0 to 100 µN in 10 seconds, held at 100 µN for 5 seconds, and decreased from 100 µN to 0 in 10 seconds).

In the heat-sealable resin layer 4, the resin forming the layer having the hardness is not particularly limited as long as the resin can be heat-sealed and the hardness is obtained. Hereinafter, the resin forming the layer having the hardness in the heat-sealable resin layer 4 will be described using as an example a resin forming the first heat-sealable resin layer 41. When the heat-sealable resin layer 4 includes the second heat-sealable resin layer 42 and the like, the first heat-sealable resin layer 41 is not required to form a layer having the hardness as long as at least one layer of the heat-sealable resin layer 4 satisfies the hardness as described above.

The resin forming the first heat-sealable resin layer 41 is preferably a resin containing a polyolefin backbone, such as a polyolefin or an acid-modified polyolefin. The first resin forming the heat-sealable resin layer 41 can be confirmed to contain a polyolefin backbone by an analysis method such as infrared spectroscopy or gas chromatography mass spectrometry. In addition, it is preferable that a peak derived from maleic anhydride is detected when the resin forming the first heat-sealable resin layer 41 is analyzed by infrared spectroscopy. For example, when a maleic anhydride-modified polyolefin is measured by infrared spectroscopy, peaks derived from maleic anhydride are detected near wave numbers of 1760 $cm^{-1}$ and 1780 $cm^{-1}$. When the first heat-sealable resin layer 41 is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

Specific examples of the polyolefin to be acid-modified include polyethylenes such as low-density polyethylene, medium-density polyethylene, high-density polyethylene and linear low-density polyethylene; ethylene-α-olefin copolymers; polypropylene such as homopolypropylene, block copolymers of polypropylene (e.g., block copolymers of propylene and ethylene) and random copolymers of polypropylene (e.g., random copolymers of propylene and ethylene); propylene-α-olefin copolymers; and terpolymers of ethylene-butene-propylene. Among them, polypropylene is preferable. The polyolefin resin in the case of a copolymer may be a block copolymer or a random copolymer. These polyolefin-based resins may be used alone, or may be used in combination of two or more thereof.

The polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene; cyclic dienes such as cyclopentadiene, dicyclopentadiene, cyclohexadiene and norbornadiene. Among these polyolefins, cyclic alkenes are preferable, and norbornene is more preferable.

The acid-modified polyolefin is a polymer with the polyolefin modified by subjecting the polyolefin to block polymerization or graft polymerization with an acid component. As the polyolefin to be acid-modified, the above-mentioned polyolefins, copolymers obtained by copolymerizing polar molecules such as acrylic acid or methacrylic acid with the above-mentioned polyolefins, polymers such as crosslinked polyolefins, or the like can also be used. Examples of the acid component to be used for acid modification include carboxylic acids such as maleic acid, acrylic acid, itaconic acid, crotonic acid, maleic anhydride and itaconic anhydride, and anhydrides thereof.

The acid-modified polyolefin may be an acid-modified cyclic polyolefin. The acid-modified cyclic polyolefin is a polymer obtained by copolymerizing a part of monomers forming the cyclic polyolefin in place of an acid component, or block-polymerizing or graft-polymerizing an acid component with the cyclic polyolefin. The cyclic polyolefin to be modified with an acid is the same as described above. The acid component to be used for acid modification is the same as the acid component used for modification of the polyolefin.

Examples of preferred acid-modified polyolefins include polyolefins modified with a carboxylic acid or an anhydride thereof, polypropylene modified with a carboxylic acid or an anhydride thereof, maleic anhydride-modified polyolefins, and maleic anhydride-modified polypropylene.

The first heat-sealable resin layer 41 may be formed from one resin alone, or may be formed from a blend polymer obtained by combining two or more resins.

Preferably, the first heat-sealable resin layer 41 contains polyolefin. For example, in the power storage device outer packaging material 10 of the present disclosure, it is preferable that the first heat-sealable resin layer 41 forming the surface contains a polyolefin and the second heat-sealable resin layer 42 contains an acid-modified polyolefin when the heat-sealable resin layer 4 includes the first heat-sealable resin layer 41 and the second heat-sealable resin layer 42. When the power storage device outer packaging material 10 of the present disclosure contains the adhesive layer 5, it is preferable that the first heat-sealable resin layer 41 forming the surface contains a polyolefin and the adhesive layer 5 contains an acid-modified polyolefin. Preferably, the adhesive layer 5 contains an acid-modified polyolefin, the first heat-sealable resin layer contains a polyolefin, and the second heat-sealable resin layer contains a polyolefin. More preferably, the adhesive layer 5 contains an acid-modified polypropylene, the first heat-sealable resin layer contains polypropylene, and the second heat-sealable resin layer contains polypropylene.

The first heat-sealable resin layer 41 may contain a lubricant and the like if necessary. When the first heat-sealable resin layer 41 contains a lubricant, the moldability of the power storage device outer packaging material can be improved. The lubricant is not particularly limited, and a known lubricant can be used. The lubricants may be used alone, or may be used in combination of two or more thereof.

The lubricant is not particularly limited, and is preferably an amide-based lubricant. Specific examples of the lubricant include those exemplified for the base material layer 1. The lubricants may be used alone, or may be used in combination of two or more thereof.

When a lubricant is present on the surface of the first heat-sealable resin layer 41, the amount of the lubricant present is not particularly limited, and is preferably about 10 to 50 mg/m$^2$, more preferably about 15 to 40 mg/m$^2$ from the viewpoint of improving the moldability of the power storage device outer packaging material. When a lubricant is present on the surface of the first heat-sealable resin layer 41, the first heat-sealable resin layer 41 forms the surface of the power storage device outer packaging material 10 for an electric storage device together with the lubricant.

The lubricant present on the surface of the first heat-sealable resin layer 41 may be one obtained by exuding the lubricant contained in the resin forming the first heat-sealable resin layer 41, or one obtained by applying a lubricant to the surface of the first heat-sealable resin layer 41.

The thickness of the first heat-sealable resin layer 41 is not particularly limited as long as the heat-sealable resin layer exhibits a function of being heat-sealed to hermetically seal the power storage device element.

The thickness of the first heat-sealable resin layer 41 is preferably about 100 μm or less, about 85 μm or less, or about 60 μm or less, and 5 μm or more, 10 μm or more, 20 μm or more, 30 μm or more, or 40 μm or more, and is preferably in the range of about 5 to 100 μm, about 5 to 85 μm, about 5 to 60 μm, about 10 to 100 μm, about 10 to 85 μm, about 10 to 60 μm, about 20 to 100 μm, about 20 to 85 μm, about 20 to 60 μm, about 30 to 100 μm, about 30 to 85 μm, about 30 to 60 μm, about 40 to 100 μm, about 40 to 85 μm, or about 40 to 60 μm.

Specifically, when the heat-sealable resin layer 4 includes a single layer of the first heat-sealable resin layer 41, the thickness of the first heat-sealable resin layer 41 is preferably about 100 μm or less, about 85 μm or less, about 60 μm or less, or about 25 μm or less, and 5 μm or more, 10 μm or more, 20 μm or more, 30 μm or more, or 40 μm or more, and is preferably in the range of about 5 to 100 μm, about 5 to 85 μm, about 5 to 60 μm, about 5 to 25 μm, about 10 to 100 μm, about 10 to 85 μm, about 10 to 60 μm, about 10 to 25 μm, about 20 to 100 μm, about 20 to 85 μm, about 20 to 60 μm, about 20 to 25 μm, about 30 to 100 μm, about 30 to 85 μm, about 30 to 60 μm, about 40 to 100 μm, about 40 to 85 μm, or about 40 to 60 μm.

When the heat-sealable resin layer 4 includes the first heat-sealable resin layer 41 and the second heat-sealable resin layer 42, the thickness of the first heat-sealable resin layer 41 is preferably about 85 µm or less, about 60 µm or less, or about 25 µm or less, and 5 µm or more, 10 µm or more, 20 µm or more, 30 µm or more, or 40 µm or more, and is preferable in the range of about 5 to 85 µm, about 5 to 60 µm, about 5 to 25 µm, about 10 to 85 µm, about 10 to 60 µm, about 10 to 25 µm, about 20 to 85 µm, about 20 to 60 µm, about 20 to 25 µm, about 30 to 85 µm, about 30 to 60 µm, about 40 to 85 µm, or about 40 to 60 µm.

When the heat-sealable resin layer 4 includes the second heat-sealable resin layer 42, the resin forming the second heat-sealable resin layer 42 is preferably a resin containing a polyolefin backbone, such as a polyolefin or an acid-modified polyolefin. These resins are the same as the resins described for the first heat-sealable resin layer 41. The resin forming the second heat-sealable resin layer 42 can be confirmed to contain a polyolefin backbone by an analysis method such as infrared spectroscopy or gas chromatography mass spectrometry, and the analysis method is not particularly limited. In addition, it is preferable that a peak derived from maleic anhydride is detected when the resin forming the second heat-sealable resin layer 42 is analyzed by infrared spectroscopy. For example, when a maleic anhydride-modified polyolefin is measured by infrared spectroscopy, peaks derived from maleic anhydride are detected near wave numbers of 1760 $cm^{-1}$ and 1780 $cm^{-1}$. When the second heat-sealable resin layer 42 is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

The resins forming the first heat-sealable resin layer 41 and the second heat-sealable resin layer 42 may be the same as or different from each other, are preferably different from each other. The phrase "the resins forming the first heat-sealable resin layer 41 and the second heat-sealable resin layer 42 are different from each other" means that the resins are different in type, or different in physical property such as hardness, a melting point, a softening point or a crystallinity degree. Specifically, the resins are different in type such that the resin forming the second heat-sealable resin layer is an acid-modified polyolefin and the resin forming the first heat-sealable resin layer is a polyolefin, or the resin forming the first heat-sealable resin layer and the resin forming the second heat-sealable resin layer are both polyolefins, and the layers are different in hardness.

Preferably, the second heat-sealable resin layer 42 contains a polyolefin. In particular, when the heat-sealable resin layer 4 includes the first heat-sealable resin layer 41 and the second heat-sealable resin layer 42, and includes the later-described adhesive layer 5, it is preferable that the second heat-sealable resin layer 42 contains polyolefin. As described above, in the power storage device outer packaging material 10 of the present disclosure, it is preferable that the first heat-sealable resin layer 41 forming the surface contains a polyolefin and the second heat-sealable resin layer 42 contains an acid-modified polyolefin when the heat-sealable resin layer 4 includes the first heat-sealable resin layer 41 and the second heat-sealable resin layer 42 and does not include the later-described adhesive layer 5.

The thickness of the second heat-sealable resin layer 42 is not particularly limited as long as the heat-sealable resin layer 4 exhibits a function of being heat-sealed to hermetically seal the power storage device element.

Figure 13:
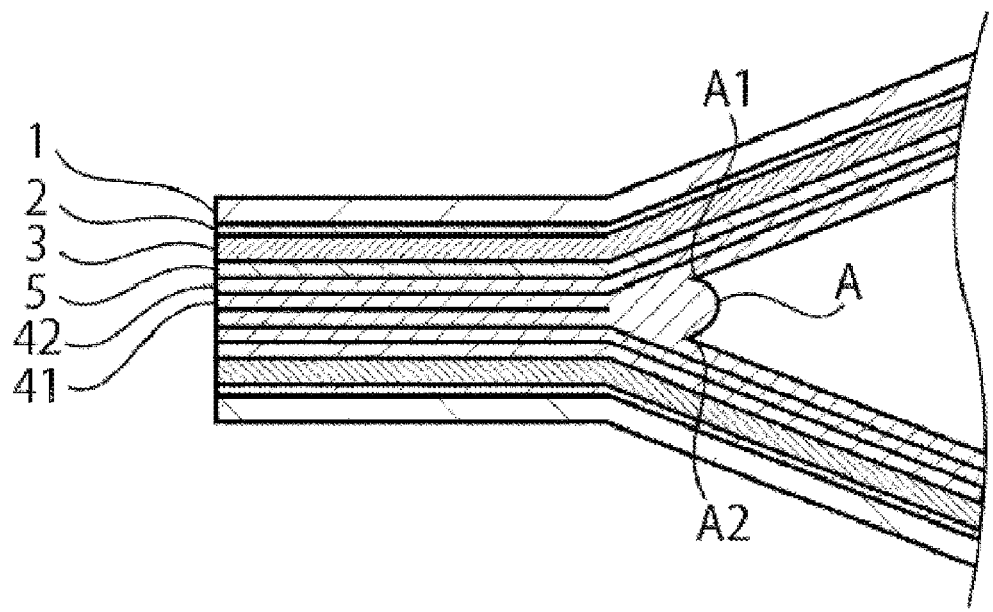
FIG. 13 is a schematic diagram for illustrating a protruding portion formed inside the heat-sealed portion of the heat-sealable resin layer.

The thickness of the second heat-sealable resin layer 42 is preferably larger than the thickness of the first heat-sealable resin layer 41 from the viewpoint of improving the insulation quality when a press pressure is applied to the power storage device. As the first heat-sealable resin layer 41, a resin that easily flows at a high temperature is preferably used so as to give excellent heat-sealability. It is possible to appropriately adjust the MFR, the melting point, the molecular weight or the like of the first heat-sealable resin layer 41 for obtaining a resin that easily flows at a high temperature. Since the thickness of the second heat-sealable resin layer 42 is larger than the thickness of the first heat-sealable resin layer 41, the heat-sealable resin layer 4 is suitably inhibited from protruding to a large extent to the inner side of the heat-sealable portion (the side of a space in which the power storage device element is stored) in the heat-sealed portion formed by heat-sealing the heat-sealable resin layer 4. If the heat-sealable resin layer 4 protrudes to a large extent to the inner side of the heat-sealed portion, cracks are generated in the heat-sealable resin layer 4 with the protruding portion (a so-called polymer sump) as an origination point, so that insulation quality is easily deteriorated. FIG. 13 is a schematic sectional diagram in which a protruding portion A is formed on the inner side of the heat-sealed portion of the heat-sealable resin layer 4. As shown in the sectional diagram, end points A1 and A2 are present in the protruding portion A, and these end points A1 and A2 are likely to be origination points of cracks because of their structure. Therefore, if the heat-sealable resin layer 4 protrudes to a large extent to the inner side of the heat-sealed portion, so that a protruding portion is formed, deterioration of insulation quality by cracks easily occurs.

From the viewpoint of exhibiting higher insulation quality when a press pressure is applied to the power storage device, the thickness of the second heat-sealable resin layer 42 is preferably about 100 µm or less, about 85 µm or less, or about 60 µm or less, and 5 µm or more, 10 µm or more, 20 µm or more, 30 µm or more, or 40 µm or more, and is preferably in the range of about 5 to 100 µm, about 5 to 85 µm, about 5 to 60 µm, about 10 to 100 µm, about 10 to 85 µm, about 10 to 60 µm, about 20 to 100 µm, about 20 to 85 µm, about 20 to 60 µm, about 30 to 100 µm, about 30 to 85 µm, about 30 to 60 µm, about 40 to 100 µm, about 40 to 85 µm, or about 40 to 60 µm.

The heat-sealable resin layer 4 may further include other heat-sealable resin layers such as a third heat-sealable resin layer and a fourth heat-sealable resin layer on the barrier layer 3 side of the second heat-sealable resin layer 42 in addition to the first heat-sealable resin layer 41 and the second heat-sealable resin layer 42. Examples of other resins forming the heat-sealable resin layer include the same as the resins described for the first heat-sealable resin layer 41. The thickness of each of the other heat-sealable resin layers is, for example, the same thickness as the thickness described for the second heat-sealable resin layer 42.

In the heat-sealable resin layer 4, the thickness of the layer having a hardness of 70 MPa or more and the largest thickness is preferably larger than the thickness of the adhesive layer 5.

The total thickness of the heat-sealable resin layer 4 is preferably about 100 µm or less, about 85 µm or less, or about 60 µm or less, and 5 µm or more, 10 µm or more, 20 µm or more, 30 µm or more, or 40 µm or more, and is preferably in the range of about 5 to 100 µm, about 5 to 85 µm, about 5 to 60 µm, about 10 to 100 µm, about 10 to 85

µm, about 10 to 60 µm, about 20 to 100 µm, about 20 to 85 µm, about 20 to 60 µm, about 30 to 100 µm, about 30 to 85 µm, about 30 to 60 µm, about 40 to 100 µm, about 40 to 85 µm, or about 40 to 60 µm.

Figure 9:
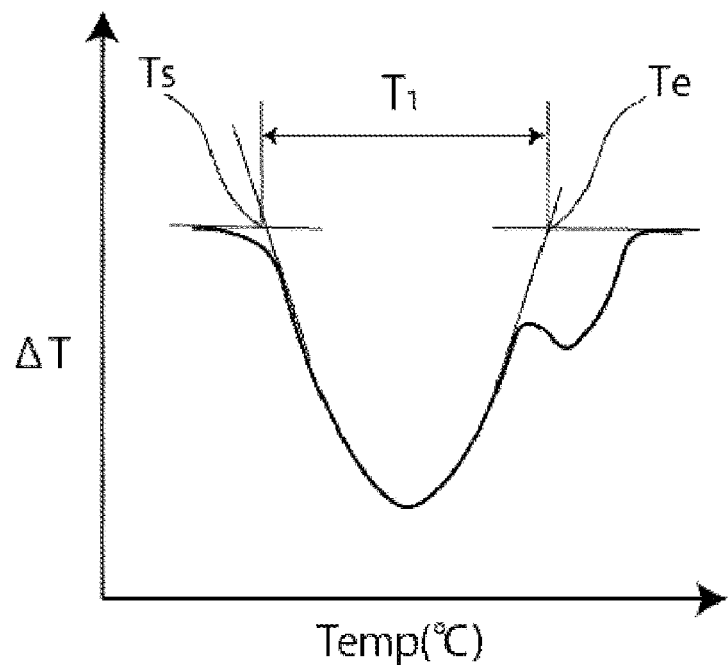
FIG. 9 is a diagram schematically showing a temperature difference $T_1$ and a temperature difference $T_2$ in differential scanning calorimetry.
Figure 9:
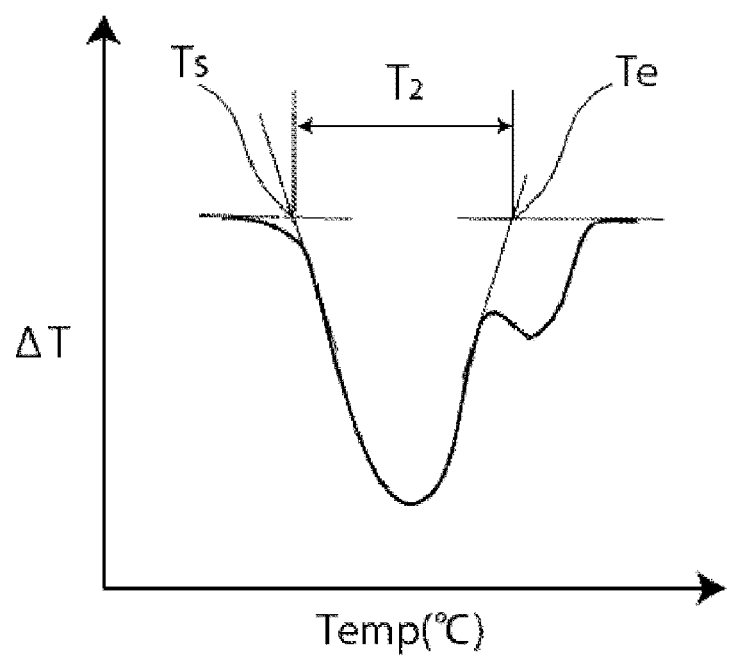

When the temperature difference $T_1$ and the temperature difference $T_2$ are measured by the following method, a value (ratio $T_2/T_1$) obtained by dividing the temperature difference $T_2$ by the temperature difference $T_1$ is, for example, 0.65 or more, preferably 0.70 or more from the viewpoint of exhibiting higher sealing strength even if the first heat-sealable resin layer is heat-sealed with the electrolytic solution deposited on the first heat-sealable resin layer by contact of the electrolytic solution with the first heat-sealable resin layer in a high-temperature environment. As understood from details of measurement of temperature differences $T_1$ and $T_2$ as described below, the closer the ratio $T_2/T_1$ is to the upper limit value of 1.0, the smaller the change in the width between the start point (extrapolated melting start temperature) and the end point (extrapolated melting end temperature) of the melting peak before and after the first heat-sealable resin layer contacts the electrolytic solution is (see the schematic diagram of FIG. 9). That is, the value of $T_2$ is normally equal to or less than the value of $T_1$. As a factor of increasing the change in the width between the extrapolated melting start temperature and the extrapolated melting end temperature of the melting peak, a low-molecular-weight resin contained in the resin forming the first heat-sealable resin layer is eluted into the electrolytic solution by contacting the electrolytic solution, and the width between the extrapolated melting start temperature and the extrapolated melting end temperature of the melting peak of the first heat-sealable resin layer after the contact with the electrolytic solution is smaller than that before the contact with the electrolytic solution. Examples of the methods for reducing the change in the width between the extrapolated melting start temperature and the extrapolated melting end temperature of the melting peak include a method in which the proportion of the low-molecular-weight resin contained in the resin forming the first heat-sealable resin layer.

(Measurement of temperature difference $T_1$)

In accordance with the provision of JIS K7121: 2012, differential scanning calorimetry (DSC) is carried out to obtain a DSC curve for the resin used for the first heat-sealable resin layer of each of the power storage device outer packaging materials. From the obtained DSC curve, the temperature difference $T_1$ between the extrapolated melting start temperature and the extrapolated melting end temperature in the melting peak temperature of the first heat-sealable resin layer is measured.

(Measurement of temperature difference $T_2$)

In an environment at a temperature of 85° C., the resin used for the first heat-sealable resin layer is left to stand for 72 hours in an electrolytic solution in which the concentration of lithium hexafluorophosphate is 1 mol/l and the volume ratio of ethylene carbonate, diethyl carbonate, and dimethyl carbonate is 1:1:1, and the resin is then sufficiently dried. Next, in accordance with the provision of JIS K7121: 2012, differential scanning calorimetry (DSC) is carried out to obtain a DSC curve for the polypropylene after drying. Next, from the obtained DSC curve, the temperature difference $T_2$ between the extrapolated melting start temperature and the extrapolated melting end temperature in the melting peak temperature of the first heat-sealable resin layer after drying is measured.

In measurement of the extrapolated melting start temperature and the extrapolated melting end temperature in the melting peak temperature, a commercially available product can be used as a differential scanning calorimeter. As the DSC curve, the test sample is held at −50° C. for 10 minutes, then heated to 200° C. at a temperature rising rate of 10° C./min (first time), held at 200° C. for 10 minutes, then cooled to −50° C. at a temperature lowering rate of −10° C./min, held at −50° C. for 10 minutes, then heated to 200° C. at a temperature rising rate of 10° C./min (second time), and held at 200° C. for 10 minutes, and a DSC curve in heating of the test sample to 200° C. at the second time is used. In measurement of the temperature difference $T_1$ and the temperature difference $T_2$, a melting peak at which the difference in input of heat energy is the largest among melting peaks appearing in the range of 120 to 160° C. in each DSC curve is analyzed. Even when two or more peaks are present while overlapping one another, only the melting peak at which the difference in the input of heat energy is the largest is analyzed.

The extrapolated melting start temperature means the start point of the melting peak temperature, and is a temperature at an intersection between a straight line obtained by extending the baseline on the low temperature (65 to 75° C.) side to the high temperature side and a tangent line drawn at a point giving the largest gradient and on a curve on the low temperature side of the melting peak at which the difference in input of heat energy is the largest. The extrapolated melting end temperature means the end point of the melting peak temperature, and is a temperature at an intersection between a straight line obtained by extending the baseline on the high temperature (170° C.) side to the low temperature side and a tangent line drawn at a point giving the largest gradient and on a curve on the high temperature side of the melting peak at which the difference in input of heat energy is the largest.

In the power storage device outer packaging material of the present disclosure, the value (ratio $T_2/T_1$) obtained by dividing the temperature difference $T_2$ by the temperature difference $T_1$ is preferably 0.60 or more, more preferably 0.70 or more, still more preferably 0.75 or more, and is preferable in the range of about 0.60 to 1.0, about 0.70 to 1.0, or about 0.75 to 1.0, from the viewpoint of exhibiting higher sealing strength even if the first heat-sealable resin layer is heat-sealed with the electrolytic solution deposited on the first heat-sealable resin layer by contact of the electrolytic solution with the first heat-sealable resin layer in a high-temperature environment. The upper limit is, for example, 1.0. For setting such a ratio $T_2/T_1$, for example, the type, composition, molecular weight and the like of the resin forming the first heat-sealable resin layer 41 are adjusted.

The absolute value $|T_2-T_1|$ of the difference between the temperature difference $T_2$ and the temperature difference $T_1$ is, for example, about 15° C. or less, preferably about 10° C. or less, more preferably about 8° C. or less, still more preferably about 7.5° C. or less, and is preferably in the range of about 0 to 15° C., about 0 to 10° C., about 0 to 8° C., about 0 to 7.5° C., about 1 to 15° C., about 1 to 10° C., about 1 to 8° C., about 1 to 7.5° C., about 2 to 15° C., about 2 to 10° C., about 2 to 8° C., about 2 to 7.5° C., about 5 to 15° C., about 5 to 10° C., about 5 to 8° C., or about 5 to 7.5° C., from the viewpoint of exhibiting higher sealing strength even if the first heat-sealable resin layer is heat-sealed with the electrolytic solution deposited on the first heat-sealable resin layer by contact of the electrolytic solution with the first heat-sealable resin layer in a high-temperature environment. The lower limit of the absolute value $|T_2-T_1|$ of the difference is, for example, 0° C., 1° C., 2° C., or 5° C. For setting such an absolute value $|T_2-T_1|$, for example, the type, composition, molecular weight and the like of the resin forming the first heat-sealable resin layer 41 are adjusted.

The temperature difference $T_1$ is preferably about 29 to 38° C., more preferably about 32 to 36° C. The temperature difference $T_2$ is preferably about 17 to 30° C., more preferably about 26 to 29° C. For setting such temperature differences $T_2$ and $T_1$, for example, the type, composition, molecular weight and the like of the resin forming the first heat-sealable resin layer 41 are adjusted.

[Adhesive Layer 5]

In the power storage device outer packaging material of the present disclosure, the adhesive layer 5 is a layer provided between the barrier layer 3 (or corrosion-resistant film) and the heat-sealable resin layer 4 if necessary for firmly bonding these layers to each other.

The adhesive layer 5 is formed from a resin capable of bonding the barrier layer 3 and the heat-sealable resin layer 4 to each other. The resin to be used for forming the adhesive layer 5 is, for example, the same as that of the adhesive exemplified for the adhesive agent layer 2. Preferably, the resin to be used for forming the adhesive layer 5 contains a polyolefin backbone. Examples thereof include the polyolefins and acid-modified polyolefins exemplified for the first heat-sealable resin layer 41 described above. The resin forming the adhesive layer 5 can be confirmed to contain a polyolefin backbone by an analysis method such as infrared spectroscopy or gas chromatography mass spectrometry, and the analysis method is not particularly limited. In addition, it is preferable that a peak derived from maleic anhydride is detected when the resin forming the adhesive layer 5 is analyzed by infrared spectroscopy. For example, when a maleic anhydride-modified polyolefin is measured by infrared spectroscopy, peaks derived from maleic anhydride are detected near wave numbers of 1760 cm$^{-1}$ and 1780 cm$^{-1}$. However, if the degree of acid modification is low, the peaks may be too small to be detected. In that case, the peaks can be analyzed by nuclear magnetic resonance spectroscopy.

The adhesive layer 5 can be formed from a thermoplastic resin or a cured product of a thermosetting resin. Preferably, the adhesive layer 5 is formed from a thermoplastic resin.

From the viewpoint of firmly bonding the barrier layer 3 and the heat-sealable resin layer 4 to each other, it is preferable that the adhesive layer 5 contains an acid-modified polyolefin. As the acid-modified polyolefin, polyolefins modified with a carboxylic acid or an anhydride thereof, polypropylene modified with a carboxylic acid or an anhydride thereof, maleic anhydride-modified polyolefins, and maleic anhydride-modified polypropylene is especially preferable.

Further, from the viewpoint of obtaining a power storage device outer packaging material excellent in shape stability after molding while decreasing the thickness of the power storage device outer packaging material, the adhesive layer 5 is more preferably a cured product of a resin composition containing an acid-modified polyolefin and a curing agent. Preferred examples of the acid-modified polyolefin include those described above.

It is preferable that the first heat-sealable resin layer 41 forming the surface contains a polyolefin and the adhesive layer 5 contains an acid-modified polyolefin when the power storage device outer packaging material 10 of the present disclosure contains the adhesive layer 5 as described above.

The adhesive layer 5 is preferably a cured product of a resin composition containing an acid-modified polyolefin and at least one selected from the group consisting of a compound having an isocyanate group, a compound having an oxazoline group, and a compound having an epoxy group, especially preferably a cured product of a resin composition containing an acid-modified polyolefin and at least one selected from the group consisting of a compound having an isocyanate group and a compound having an epoxy group. Preferably, the adhesive layer 5 preferably contains at least one selected from the group consisting of polyurethane, polyester and epoxy resin. More preferably, the adhesive layer 5 contains polyurethane and epoxy resin. As the polyester, for example, an amide ester resin is preferable. The amide ester resin is generally produced by reaction of a carboxyl group with an oxazoline group. The adhesive layer 5 is more preferably a cured product of a resin composition containing at least one of these resins and the acid-modified polyolefin. When an unreacted substance of a curing agent, such as a compound having an isocyanate group, a compound having an oxazoline group, or an epoxy resin remains in the adhesive layer 5, the presence of the unreacted substance can be confirmed by, for example, a method selected from infrared spectroscopy, Raman spectroscopy, time-of-flight secondary ion mass spectrometry (TOF-SIMS) and the like.

From the viewpoint of further improving adhesion between the barrier layer 3 and the adhesive layer 5, the adhesive layer 5 is preferably a cured product of a resin composition containing a curing agent having at least one selected from the group consisting of an oxygen atom, a heterocyclic ring, a C=N bond, and a C—O—C bond. Examples of the curing agent having a heterocyclic ring include curing agents having an oxazoline group, and curing agents having an epoxy group. Examples of the curing agent having a C=N bond include curing agents having an oxazoline group and curing agents having an isocyanate group. Examples of the curing agent having a C—O—C bond include curing agents having an oxazoline group, curing agents having an epoxy group, and polyurethane. Whether the adhesive layer 5 is a cured product of a resin composition containing any of these curing agents can be confirmed by, for example, a method such as gas chromatography-mass spectrometry (GCMS), infrared spectroscopy (IR), time-of-flight secondary ion mass spectrometry (TOF-SIMS), or X-ray photoelectron spectroscopy (XPS).

The compound having an isocyanate group is not particularly limited, and is preferably a polyfunctional isocyanate compound from the viewpoint of effectively improving adhesion between the barrier layer 3 and the adhesive layer 5. The polyfunctional isocyanate compound is not particularly limited as long as it is a compound having two or more isocyanate groups. Specific examples of the polyfunctional isocyanate-based curing agent include pentane diisocyanate (PDI), isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers. Examples thereof include adduct forms, biuret forms, and isocyanurate forms.

The content of the compound having an isocyanate group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

The compound having an oxazoline group is not particularly limited as long as it is a compound having an oxazoline backbone. Specific examples of the compound having an oxazoline group include compounds having a polystyrene main chain and compounds having an acrylic main chain.

Examples of the commercially available product include EPOCROS series manufactured by Nippon Shokubai Co., Ltd.

The proportion of the compound having an oxazoline group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

Examples of the compound having an epoxy group include epoxy resins. The epoxy resin is not particularly limited as long as it is a resin capable of forming a crosslinked structure by epoxy groups existing in the molecule, and a known epoxy resin can be used. The weight average molecular weight of the epoxy resin is preferably about 50 to 2000, more preferably about 100 to 1000, still more preferably about 200 to 800. In the present invention, the weight average molecular weight of the epoxy resin is a value obtained by performing measurement by gel permeation chromatography (GPC) under the condition of using polystyrene as a standard sample.

Specific examples of the epoxy resin include glycidyl ether derivatives of trimethylolpropane, bisphenol A diglycidyl ether, modified bisphenol A diglycidyl ether, novolak glycidyl ether, glycerin polyglycidyl ether and polyglycerin polyglycidyl ether. The epoxy resins may be used alone, or may be used in combination of two or more thereof.

The proportion of the epoxy resin in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

The polyurethane is not particularly limited, and a known polyurethane can be used. The adhesive layer 5 may be, for example, a cured product of two-liquid curable polyurethane.

The proportion of the polyurethane in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5 in an atmosphere including a component which induces corrosion of the barrier layer, such as an electrolytic solution.

When the adhesive layer 5 is a cured product of a resin composition containing at least one selected from the group consisting of a compound having an isocyanate group, a compound having an oxazoline group and an epoxy resin, and the acid-modified polyolefin, the acid-modified polyolefin functions as a main agent, and the compound having an isocyanate group, the compound having an oxazoline group, and the compound having an epoxy group each function as a curing agent.

From the viewpoint of exhibiting higher insulation quality when a press pressure is applied to the power storage device, the total thickness of the adhesive layer 5 and the heat-sealable resin layer 4 is preferably about 50 µm or more, more preferably about 60 µm or more, still more preferably about 70 µm or more, and preferably about 120 µm or less, more preferably 100 µm or less, and is preferably in the range of about 50 to 120 µm, about 50 to 100 µm, about 60 to 120 µm, about 60 to 100 µm, about 70 to 120 µm, or about 70 to 100 µm.

In addition, the preferred ratio of the thickness of the first heat-sealable resin layer 41 and the thickness of the second heat-sealable resin layer 42 is as follows. Where the thickness of the first heat-sealable resin layer 41 is 1.0, the thickness of the second heat-sealable resin layer 42 is preferably about 1.5 to 6.0, more preferably about 1.7 to 5.5, still more preferably about 2.0 to 5.0. In addition, the preferred ratio of the thickness of the adhesive layer 5, the thickness of the first heat-sealable resin layer 41 and the thickness of the second heat-sealable resin layer 42 is as follows. Where the thickness of the first heat-sealable resin layer 41 1.0, it is preferable that the thickness of the adhesive layer 5 is about 0.5 to 3.0 and the thickness of the second heat-sealable resin layer 42 is about 1.5 to 6.0, it is more preferable that the thickness of the adhesive layer 5 is about 0.7 to 2.3 and the thickness of the second heat-sealable resin layer 42 is about 1.7 to 5.5, and it is still more preferable that the thickness of the adhesive layer 5 is about 1.0 to 2.0 and the thickness of the second heat-sealable resin layer 42 is about 2.0 to 5.0.

A specific example of the preferred ratio of the thickness of the first heat-sealable resin layer 41 and the thickness of the second heat-sealable resin layer 42 is as follows. Where the thickness of the first heat-sealable resin layer 41 is 1.0, the thickness of the second heat-sealable resin layer 42 is, for example, 2.0, 2.7, 3.0, 4.0, 5.0 or 6.0. A preferred specific example of the thickness of the adhesive layer 5, the thickness of the first heat-sealable resin layer 41 and the thickness of the second heat-sealable resin layer 42 is as follows. Where the thickness of the first heat-sealable resin layer 41 is 1.0, the thickness of the adhesive layer 5 is 1.0 and the thickness of the second heat-sealable resin layer 42 is 2.0, the thickness of the adhesive layer 5 is 1.7 and the thickness of the second heat-sealable resin layer 42 is 2.7, the thickness of the adhesive layer 5 is 1.3 and the thickness of the second heat-sealable resin layer 42 is 3.0, and the thickness of the adhesive layer 5 is 2.0 and the thickness of the second heat-sealable resin layer 42 is 5.0.

The thickness of the adhesive layer 5 may be larger than the thickness of the first heat-sealable resin layer 41 from the viewpoint of exhibiting higher insulation quality when a press pressure is applied to the power storage device. For example, when the heat-sealable resin layer 4 includes a single layer of the first heat-sealable resin layer 41, and the adhesive layer 5 is provided between the barrier layer 3 and the first heat-sealable resin layer 41, the thickness of the adhesive layer 5 is preferably larger than the thickness of the first heat-sealable resin layer 41. As the first heat-sealable resin layer 41, a resin that more easily flows at a higher temperature as compared to the adhesive layer 5 is preferably used so as to give excellent heat-sealability. By providing such a thickness relationship, the first heat-sealable resin layer 41, which forms the heat-sealable resin layer 4 and is formed of a resin that easily flows, can be thinned to improve the insulation quality of the power storage device outer packaging material. It is possible to appropriately adjust the MFR, the melting point, the molecular weight or the like of the first heat-sealable resin layer 41 for obtaining a resin that easily flows at a high temperature.

In the power storage device outer packaging material 10, the thickness of the second heat-sealable resin layer 42 is preferably larger than the thickness of the adhesive layer 5 when the heat-sealable resin layer 4 includes the first heat-sealable resin layer 41 and the second heat-sealable resin layer 42, from the viewpoint of insulation quality when a press pressure is applied to the power storage device. Since the second heat-sealable resin layer 42 has a better moisture barrier property as compared to the adhesive layer 5 contributing to bonding, the moisture barrier property of the power storage device outer packaging material can be improved by providing such a thickness relationship.

From the viewpoint of exhibiting high insulation quality after heat-sealing of the heat-sealable resin layer, it is preferable that the thickness of the second heat-sealable resin layer 42 is larger than the thickness of the adhesive layer 5 and the thickness of the adhesive layer 5 is larger than the thickness of the first heat-sealable resin layer 41.

The thickness of the adhesive layer 5 is preferably about 60 µm or less, about 50 µm or less, about 40 µm or less, about 30 µm or less, about 20 µm or less, about 10 µm or less, about 8 µm or less, about 5 µm or less, or about 3 µm or less, and preferably about 0.1 µm or more, about 0.5 µm or more, about 5 µm or more, about 10 µm or more, or about 20 µm or more, and is preferably in the range of about 0.1 to 60 µm, about 0.1 to 50 µm, about 0.1 to 40 µm, about 0.1 to 30 µm, about 0.1 to 20 µm, about 0.1 µm to 10 µm, about 0.1 to 8 µm, about 0.1 to 5 µm, about 0.1 to 3 µm, about 0.5 to 60 µm, about 0.5 to 50 µm, about 0.5 to 40 µm, about 0.5 to 30 µm, about 0.5 to 20 µm, about 0.5 µm to 10 µm, about 0.5 to 8 µm, about 0.5 to 5 µm, about 0.5 to 3 µm, about 5 to 60 µm, about 5 to 50 µm, about 5 to 40 µm, about 5 to 30 µm, about 5 to 20 µm, about 5 µm to 10 µm, about 5 to 8 µm, about 10 to 60 µm, about 10 to 50 µm, about 10 to 40 µm, about 10 to 30 µm, or about 10 to 20 µm. More specifically, in the case of a cured product of the adhesive exemplified for the adhesive agent layer 2 or an acid-modified polyolefin and a curing agent, the thickness of the adhesive layer is preferably about 1 to 10 µm, more preferably 1 µm or more and less than 10 µm, still more preferably about 1 to 8 µm, even more preferably about 1 to 5 µm, even more preferably about 1 to 3 µm. When the resin exemplified for the first heat-sealable resin layer 41 is used, the thickness of the adhesive layer is preferably about 2 to 60 µm, about 2 to 50 µm, about 10 to 60 µm, about 10 to 50 µm, about 20 to 60 µm, or about 20 to 50 µm. Specifically, the adhesive layer 5 is formed of a thermoplastic resin, and the thickness of the thermoplastic resin is preferably about 2 to 60 µm, about 2 to 50 µm, about 10 to 60 µm, about 10 to 50 µm, about 20 to 60 µm, or about 20 to 50 µm. When the adhesive layer 5 is a cured product of a resin composition containing the adhesive exemplified for the adhesive agent layer 2 or an acid-modified polyolefin and a curing agent, the adhesive layer 5 can be formed by, for example, applying the resin composition and curing the resin composition by heating or the like. When the resin exemplified for the first heat-sealable resin layer 41 is used, for example, extrusion molding of the heat-sealable resin layer 4 and the adhesive layer 5 can be performed. When the power storage device outer packaging material 10 of the present disclosure includes, for example, the adhesive layer 5, the second heat-sealable resin layer 42 and the first heat-sealable resin layer 41, the adhesive layer 5, the first heat-sealable resin layer 41 and the second heat-sealable resin layer 42 can be laminated by co-extrusion molding. That is, the adhesive layer 5, the second heat-sealable resin layer 42, and the first heat-sealable resin layer 41 can be co-extruded resin layers.

In the power storage device outer packaging material 10 of the present disclosure, specific examples of the preferred laminated configuration on a side opposite to the base material layer 1 side from the barrier layer 3 include a laminated configuration in which the adhesive layer 5 having a thickness of about 20 to 60 µm and the first heat-sealable resin layer 41 having a thickness of 20 to 50 µm are laminated in this order from the barrier layer 3 side; a laminated configuration in which the adhesive layer 5 having a thickness of about 20 to 60 µm and the first heat-sealable resin layer 41 having a thickness of 20 to 40 µm are laminated in this order from the barrier layer 3 side; a laminated configuration in which the adhesive layer 5 having a thickness of about 5 to 30 µm, the second heat-sealable resin layer 42 having a thickness of about 30 to 80 µm and the first heat-sealable resin layer 41 having a thickness of about 5 to 25 µm are laminated in this order from the barrier layer 3 side; and a laminated configuration in which the adhesive layer 5 having a thickness of about 5 to 20 µm, the second heat-sealable resin layer 42 having a thickness of about 40 to 80 µm and the first heat-sealable resin layer 41 having a thickness of about 5 to 25 µm are laminated in this order from the barrier layer 3 side.

In the power storage device outer packaging material of the present disclosure, it is preferable that the adhesive layer 5 has a logarithmic decrement $\Delta E$ of, for example, 0.22 or less, 0.20 or less, 0.18 or less, 0.14 or less, or 0.13 or less at 120° C. in rigid pendulum measurement. In the present disclosure, when the logarithmic decrement $\Delta E$ at 120° C. is, for example, 0.22 or less, 0.20 or less, 0.18 or less, 0.14 or less, or 0.13 or less, high insulation quality can be exhibited when a press pressure is applied to the power storage device. In the step of applying a press pressure to the power storage device, a press pressure may be applied while heat is applied. Since the adhesive layer 5 has any of these logarithmic decrements $\Delta E$, high insulation quality can be exhibited even when a press pressure is applied to the power storage device while heat is applied.

The logarithmic decrement at 120° C. in rigid pendulum measurement is an index indicating the hardness of the resin in a high-temperature environment at 120° C. The smaller the logarithmic decrement, the higher the hardness of the resin. In the rigid pendulum measurement, the attenuation rate of the pendulum at the time of increasing the resin temperature from a low temperature to a high temperature is measured. In the rigid pendulum measurement, generally, an edge portion is brought into contact with a surface of an object to be measured, and a pendulum motion is performed in a horizontal direction to apply vibrations to the object to be measured. In the power storage device outer packaging material of the present disclosure, the hard adhesive layer 5 having a logarithmic decrement of, for example, 0.22 or less, 0.20 or less, 0.18 or less, 0.14 or less, or 0.13 or less in a high-temperature environment at 120° C. is disposed between the barrier layer 3 and the heat-sealable resin layer 4, and therefore higher insulation quality can be exhibited when a press pressure is applied to the power storage device.

The logarithmic decrement $\Delta E$ is calculated in accordance with the following expression.

$$\Delta E = [\ln(A1/A2) + \ln(A2/A3) + \ldots \ln(An/An+1)]/n$$

A: amplitude n: wavenumber

In the power storage device outer packaging material of the present disclosure, the logarithmic decrement $\Delta E$ at 120° C. is, for example, about 0.10 to 0.22 or about 0.10 to 0.20, preferably about 0.10 to 0.18, more preferably about 0.10 to 0.16, still more preferably about 0.10 to 0.14, even more preferably about 0.10 to 0.13 from the viewpoint of exhibiting higher insulation quality when a press pressure is applied to the power storage device. For setting such a logarithmic decrement $\Delta E$, for example, the type, the composition, the molecular weight or the like of the resin forming the adhesive layer 5 is adjusted.

In the measurement of the logarithmic decrement $\Delta E$, a rigid pendulum physical property test is conducted on the adhesive layer 5 with a commercially available rigid pendulum type physical property tester under the following conditions: a cylindrical cylinder edge is used as an edge portion to be pressed against the adhesive layer 5, the initial amplitude is 0.3 degrees, and the temperature is elevated from 30° C. to 200° C. at a temperature elevation rate of 3° C./min. For the adhesive layer whose logarithmic decrement ΔE is measured, the power storage device outer packaging material is immersed in 15% hydrochloric acid to dissolve the base material layer and the barrier layer, and the thus-obtained sample having only the adhesive layer and the heat-sealable resin layer is sufficiently dried, and used as an object to be measured.

It is also possible to obtain the power storage device outer packaging material from the power storage device and measure the logarithmic decrement ΔE of the adhesive layer 5. When the power storage device outer packaging material is obtained from the power storage device and the logarithmic decrement ΔE of the adhesive layer 5 is measured, a sample is cut out from a top surface portion where the power storage device outer packaging material is not extended by molding, and the sample is used as an object to be measured.

[Surface Coating Layer 6]

The power storage device outer packaging material of the present disclosure may include a surface coating layer 6 on the base material layer 1 (on a side opposite to the barrier layer 3 from the base material layer 1) if necessary for the purpose of improving at least one of designability, electrolytic solution resistance, scratch resistance, moldability and the like. The surface coating layer 6 is a layer located on the outermost layer side of the power storage device outer packaging material when the power storage device is constructed using the power storage device outer packaging material.

The surface coating layer 6 can be formed from, for example, a resin such as polyvinylidene chloride, polyester, polyurethane, acrylic resin or epoxy resin.

When the resin forming the surface coating layer 6 is a curable resin, the resin may be any of a one-liquid curable type and a two-liquid curable type, and is preferably a two-liquid curable type. Examples of the two-liquid curable resin include two-liquid curable polyurethane, two-liquid curable polyester and two-liquid curable epoxy resins. Of these, two-liquid curable polyurethane is preferable.

Examples of the two-liquid curable polyurethane include polyurethane which contains a main agent containing a polyol compound and a curing agent containing an isocyanate compound. The polyurethane is preferably two-liquid curable polyurethane having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound. Since the surface coating layer 6 is formed of polyurethane, excellent electrolytic solution resistance is imparted to the power storage device outer packaging material.

If necessary, the surface coating layer 6 may contain additives such as the lubricant, an anti-blocking agent, a matting agent, a flame retardant, an antioxidant, a tackifier and an anti-static agent on at least one of the surface and the inside of the surface coating layer 6 according to the functionality and the like to be imparted to the surface coating layer 6 and the surface thereof. The additives are in the form of, for example, fine particles having an average particle diameter of about 0.5 nm to 5 μm. The average particle diameter of the additives is a median diameter measured by a laser diffraction/scattering particle size distribution measuring apparatus.

The additives may be either inorganic substances or organic substances. The shape of the additive is not particularly limited, and examples thereof include a spherical shape, a fibrous shape, a plate shape, an amorphous shape and a scaly shape.

Specific examples of the additives include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, acrylate resins, crosslinked acryl, crosslinked styrene, crosslinked polyethylene, benzoguanamine, gold, aluminum, copper and nickel. The additives may be used alone, or may be used in combination of two or more thereof. Of these additives, silica, barium sulfate and titanium oxide are preferable from the viewpoint of dispersion stability, costs and so on. The surface of the additive may be subjected to various kinds of surface treatments such as insulation treatment and dispersibility enhancing treatment.

The method for forming the surface coating layer 6 is not particularly limited, and examples thereof include a method in which a resin for forming the surface coating layer 6 is applied. When the additive is added to the surface coating layer 6, a resin mixed with the additive may be applied.

The thickness of the surface covering layer 6 is not particularly limited as long as the above-mentioned function as the surface coating layer 6 is performed, and it is, for example, about 0.5 to 10 μm, preferably about 1 to 5 μm.

3. Method for Producing Power Storage Device Outer Packaging Material

The method for producing a power storage device outer packaging material is not particularly limited as long as a laminate is obtained in which the layers of the power storage device outer packaging material of the present disclosure are laminated. Examples thereof include a method including the step of laminating at least the base material layer 1, the barrier layer 3 and the heat-sealable resin layer 4 in this order. In the method for producing the power storage device outer packaging material 10 of the present disclosure, the heat-sealable resin layer includes a single layer or multiple layers, and the heat-sealable resin layer includes at least one layer having a hardness of 70 MPa or more as measured from a cross-section in a lamination direction of the laminate under a load of indentation of 100 μN in a nanoindentation method. Details of the power storage device outer packaging material 10 of the present disclosure are as described above.

An example of the method for producing the power storage device outer packaging material of the present disclosure is as follows. First, a laminate including the base material layer 1, the adhesive agent layer 2 and the barrier layer 3 in this order (hereinafter, the laminate may be described as a "laminate A") is formed. Specifically, the laminate A can be formed by a dry lamination method in which an adhesive to be used for formation of the adhesive agent layer 2 is applied onto the base material layer 1 or the barrier layer 3, the surface of which is subjected to a chemical conversion treatment if necessary, using a coating method such as a gravure coating method or a roll coating method, and dried, the barrier layer 3 or the base material layer 1 is then laminated, and the adhesive agent layer 2 is cured.

Then, the heat-sealable resin layer 4 is laminated on the barrier layer 3 of the laminate A. When the heat-sealable resin layer 4 is laminated directly on the barrier layer 3, the heat-sealable resin layer 4 may be laminated onto the barrier layer 3 of the laminate A by a method such as a thermal lamination method or an extrusion lamination method. When the adhesive layer 5 is provided between the barrier layer 3 and the heat-sealable resin layer 4, mention is made of, for example, (1) a method in which the adhesive layer 5 and the heat-sealable resin layer 4 are extruded to be laminated on the barrier layer 3 of the laminate A (extrusion lamination method or tandem lamination method); (2) a method in which the adhesive layer 5 and the heat-sealable resin layer 4 are laminated to form a laminate separately, and the laminate is laminated on the barrier layer 3 of the laminate A by a thermal lamination method, or a method in which a laminate with the adhesive layer 5 laminated on the barrier layer 3 of the laminate A is formed, and laminated to the heat-sealable resin layer 4 by a thermal lamination method; (3) a method in which the melted adhesive layer 5 is poured between the barrier layer 3 of the laminate A and the heat-sealable resin layer 4 formed in a sheet shape beforehand, and simultaneously the laminate A and the heat-sealable resin layer 4 are bonded together with the adhesive layer 5 interposed therebetween (sandwich lamination); and (4) an adhesive for forming the adhesive layer 5 is applied by solution coating and dried or baked to laminate the adhesive on the barrier layer 3 of the laminate A, and the heat-sealable resin layer 4 formed in a sheet shape in advance is laminated on the adhesive layer 5.

When the surface coating layer 6 is provided, the surface coating layer 6 is laminated on a surface of the base material layer 1 on a side opposite to the barrier layer 3. The surface covering layer 6 can be formed by, for example, coating a surface of the base material layer 1 with the resin that forms the surface coating layer 6. The order of the step of laminating the barrier layer 3 on a surface of the base material layer 1 and the step of laminating the surface coating layer 6 on a surface of the base material layer 1 is not particularly limited. For example, the surface coating layer 6 may be formed on a surface of the base material layer 1, followed by forming the barrier layer 3 on a surface of the base material layer 1 on a side opposite to the surface coating layer 6.

As described above, a laminate including the surface coating layer 6 provided if necessary, the base material layer 1, the adhesive agent layer 2 provided if necessary, the barrier layer 3, the adhesive layer 5 provided if necessary, and the heat-sealable resin layer 4 in this order is formed, and the laminate may be further subjected to a heating treatment for strengthening the bondability of the adhesive agent layer 2 and the adhesive layer 5 provided if necessary.

In the power storage device outer packaging material, the layers forming the laminate may be subjected to surface activation treatment such as corona treatment, blast treatment, oxidation treatment or ozone treatment if necessary to improve processing suitability. For example, by subjecting a surface of the base material layer 1, which is opposite to the barrier layer 3, to a corona treatment, the ink printability of the surface of the base material layer 1 can be improved.

4. Uses of Power Storage Device Outer Packaging Material

The power storage device outer packaging material of the present disclosure is used as a packaging for hermetically sealing and storing power storage device elements such as a positive electrode, a negative electrode and an electrolyte. That is, in a packaging formed of the power storage device outer packaging material, a power storage device element including at least a positive electrode, a negative electrode and an electrolyte can be stored to obtain a battery.

Specifically, a power storage device element including at least a positive electrode, a negative electrode and an electrolyte is covered with the power storage device outer packaging material of the present disclosure such that a flange portion (region where a heat-sealable resin layer is in contact with itself) can be formed on the periphery of the power storage device element while a metal terminal connected to each of the positive electrode and the negative electrode protrudes to the outside, and the heat-sealable resin layer at the flange portion is heat-sealed with itself, thereby providing a power storage device using the power storage device outer packaging material. When the power storage device element is stored in the packaging formed of the power storage device outer packaging material of the present disclosure, the packaging is formed in such a manner that the heat-sealable resin portion of the power storage device outer packaging material of the present disclosure is on the inner side (a surface contacting the power storage device element).

The power storage device outer packaging material of the present disclosure can be suitably used for power storage devices such as batteries (including condensers, capacitors and the like). The power storage device outer packaging material of the present disclosure may be used for either primary batteries or secondary batteries, and is preferably used for secondary batteries. The type of a secondary battery to which the power storage device outer packaging material of the present disclosure is applied is not particularly limited, and examples thereof include lithium ion batteries, lithium ion polymer batteries, solid-state batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Of these secondary batteries, preferred subjects to which the power storage device outer packaging material of the present disclosure is applied include lithium ion batteries and lithium ion polymer batteries.

EXAMPLES

Hereinafter, the present disclosure will be described in detail by way of examples and comparative examples. However, the present disclosure is not limited to examples.
<Production of Power Storage Device Outer Packaging Material>

Example 1 and Comparative Example 1

A polyethylene terephthalate (PET) film (thickness: 12 μm) and a stretched nylon (ONy) film (thickness: 15 μm) were prepared as base material layers, and a two-liquid urethane adhesive (polyol compound and aromatic isocyanate-based compound) was applied to the PET film (3 μm) to bond the PET film to the ONy film. In addition, an aluminum foil (JIS H4160: 1994A 8021 H-O (thickness: 40 μm)) was prepared as a barrier layer. Next, a two-liquid urethane adhesive (polyol compound and aromatic isocyanate-based compound) was applied to one surface of the aluminum foil, so that an adhesive agent layer (thickness: 3 μm) was formed on the barrier layer. The adhesive agent layer on the barrier layer and the base material layer (ONy film side) were then laminated by a dry lamination method, and aging treatment was then performed to prepare a laminate of base material layer/adhesive agent layer/barrier layer. Both surfaces of the aluminum foil are subjected to chemical conversion treatment. The chemical conversion treatment of the aluminum foil was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry mass), and performing baking.

Next, maleic anhydride-modified polypropylene as an adhesive layer (thickness: 20 μm), random polypropylene as a second heat-sealable resin layer (thickness: 50 μm) and random polypropylene as a first heat-sealable resin layer (thickness: 10 μm) were co-extruded onto the barrier layer of each of the obtained laminates to laminate the adhesive layer, the second heat-sealable resin layer and the first heat-sealable resin layer on the barrier layer, thereby obtaining a power storage device outer packaging material in which a base material layer (thickness: 30 μm including an adhesive), an adhesive agent layer (3 μm), a barrier layer (40 μm), an adhesive layer (20 μm), a second heat-sealable resin layer (50 μm) and a first heat-sealable resin layer (10 μm) were laminated in this order.

The first heat-sealable resin layer and the second heat-sealable resin layer in Example 1 and Comparative Example 1 have hardnesses (hardnesses measured using a nanoindenter) as described in Table 1. The adhesive layers in Example 1 and Comparative Example 1 have logarithmic decrements ΔE (values obtained by performing measurement using a rigid pendulum type physical property tester) at 120° C. as described in Table 1.

Example 2 and Comparative Examples 2 and 3

A polyethylene terephthalate (PET) film (thickness: 12 μm) and a stretched nylon (ONy) film (thickness: 15 μm) were prepared as base material layers, and a two-liquid urethane adhesive (polyol compound and aromatic isocyanate-based compound) was applied to the PET film (3 μm) to bond the PET film to the ONy film. In addition, an aluminum foil (JIS H4160: 1994A 8021 H-O (thickness: 40 μm)) was prepared as a barrier layer. Next, a two-liquid urethane adhesive (polyol compound and aromatic isocyanate-based compound) was applied to one surface of the aluminum foil, so that an adhesive agent layer (thickness: 3 μm) was formed on the barrier layer. The adhesive agent layer on the barrier layer and the base material layer (ONy film side) were then laminated by a dry lamination method, and aging treatment was then performed to prepare a laminate of base material layer/adhesive agent layer/barrier layer. Both surfaces of the aluminum foil are subjected to chemical conversion treatment. The chemical conversion treatment of the aluminum foil was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry mass), and performing baking.

Next, maleic anhydride-modified polypropylene as an adhesive layer (thickness: 40 μm) and random polypropylene as a first heat-sealable resin layer (thickness: 40 μm) were co-extruded onto the barrier layer of each of the obtained laminates to laminate the adhesive layer and the first heat-sealable resin layer on the barrier layer, thereby obtaining a power storage device outer packaging material in which a base material layer (thickness: 30 μm including an adhesive), an adhesive agent layer (3 μm), a barrier layer (40 μm), an adhesive layer (40 μm) and a first heat-sealable resin layer (40 μm) were laminated in this order.

The first heat-sealable resin layers in Example 2 and Comparative Examples 2 and 3 have hardnesses (hardnesses measured using a nanoindenter) as described in Table 1. The adhesive layers in Example 2 and Comparative Examples 2 and 3 have logarithmic decrements ΔE (values obtained by performing measurement using a rigid pendulum type physical property tester) at 120° C. as described in Table 1.

Example 3

Except that as a base material layer, a polyethylene terephthalate (PET) film (thickness: 25 μm) was used in place of the laminate of a polyethylene terephthalate (PET) film (thickness: 12 μm) and a stretched nylon (ONy) film (thickness: 15 μm), the same procedure as in Example 1 was carried out to obtain a power storage device outer packaging material in which a base material layer (thickness: 25 μm), an adhesive agent layer (3 μm), a barrier layer (40 μm), an adhesive layer (20 μm), a second heat-sealable resin layer (50 μm) and a first heat-sealable resin layer (10 μm) were laminated in this order.

Example 4

Except that as a base material layer, a stretched nylon (ONy) film (thickness: 25 μm) was used in place of the laminate of a polyethylene terephthalate (PET) film (thickness: 12 μm) and a stretched nylon (ONy) film (thickness: 15 μm), the same procedure as in Example 1 was carried out to obtain a power storage device outer packaging material in which a base material layer (thickness: 25 μm), an adhesive agent layer (3 μm), a barrier layer (40 μm), an adhesive layer (20 μm), a second heat-sealable resin layer (50 μm) and a first heat-sealable resin layer (10 μm) were laminated in this order.

Example 5

Except that the thicknesses of the adhesive layer, the first heat-sealable resin layer and the second heat-sealable resin layer were set to values as shown in Table 2, the same procedure as in Example 1 was carried out to obtain a power storage device outer packaging material in which a base material layer (thickness 30 μm including an adhesive), an adhesive agent layer (3 μm), a barrier layer (40 μm), an adhesive layer (20 μm), a second heat-sealable resin layer (40 μm) and a first heat-sealable resin layer (20 μm) were laminated in this order.

Example 6

Except that the thicknesses of the adhesive layer, the first heat-sealable resin layer and the second heat-sealable resin layer were set to values as shown in Table 2, the same procedure as in Example 1 was carried out to obtain a power storage device outer packaging material in which a base material layer (thickness 30 μm including an adhesive), an adhesive agent layer (3 μm), a barrier layer (40 μm), an adhesive layer (20 μm), a second heat-sealable resin layer (45 μm) and a first heat-sealable resin layer (15 μm) were laminated in this order.

Example 7

Except that the thicknesses of the adhesive layer, the first heat-sealable resin layer and the second heat-sealable resin layer were set to values as shown in Table 2, the same procedure as in Example 1 was carried out to obtain a power storage device outer packaging material in which a base material layer (thickness 30 μm including an adhesive), an adhesive agent layer (3 μm), a barrier layer (40 μm), an adhesive layer (25 μm), a second heat-sealable resin layer (40 μm) and a first heat-sealable resin layer (15 μm) were laminated in this order.

Comparative Example 4

Except that the thicknesses of the adhesive layer, the first heat-sealable resin layer and the second heat-sealable resin layer were set to values as shown in Table 2, the same procedure as in Comparative Example 1 was carried out to obtain a power storage device outer packaging material in which a base material layer (thickness 30 μm including an adhesive), an adhesive agent layer (3 μm), a barrier layer (40 μm), an adhesive layer (20 μm), a second heat-sealable resin layer (40 μm) and a first heat-sealable resin layer (20 μm) were laminated in this order.

Comparative Example 5

Except that the thicknesses of the adhesive layer, the first heat-sealable resin layer and the second heat-sealable resin layer were set to values as shown in Table 2, the same procedure as in Comparative Example 1 was carried out to obtain a power storage device outer packaging material in which a base material layer (thickness 30 μm including an adhesive), an adhesive agent layer (3 μm), a barrier layer (40 μm), an adhesive layer (20 μm), a second heat-sealable resin layer (45 μm) and a first heat-sealable resin layer (15 μm) were laminated in this order.

Comparative Example 6

Except that the thicknesses of the adhesive layer, the first heat-sealable resin layer and the second heat-sealable resin layer were set to values as shown in Table 2, the same procedure as in Comparative Example 1 was carried out to obtain a power storage device outer packaging material in which a base material layer (thickness 30 μm including an adhesive), an adhesive agent layer (3 μm), a barrier layer (40 μm), an adhesive layer (25 μm), a second heat-sealable resin layer (40 μm) and a first heat-sealable resin layer (15 μm) were laminated in this order.

<Measurement of Hardness of Heat-Sealable Resin Layer by Indentation Method>

The hardness of each of the first heat-sealable resin layer and the second heat-sealable resin layer was measured using a nanoindenter (TriboIndenter TI 950 manufactured by HYSITRON, Inc.). In the nanoindenter, a regular triangular pyramid-shaped indenter (TI-0039 manufactured by HYSITRON, Inc.) (Berkovich type) having a diamond chip at the tip thereof was used. At room temperature (25° C.), each of the power storage device outer packaging materials obtained in Examples and Comparative Examples was cut in the lamination direction to expose cross sections of the first heat-sealable resin layer and the second heat-sealable resin layer. Next, using the nanoindenter, the hardness is measured at the time of perpendicularly pressing the indenter into the first heat-sealable resin layer and the second heat-sealable resin layer. As measurement conditions, a load control method was used, and the pressing load was constant at 100 μN (the applied load was increased from 0 to 100 μN in 10 seconds, held at 100 μN for 5 seconds, and decreased from 100 to 0 μN in 10 seconds). Table 1 shows the results.

<Measurement of Logarithmic Decrement ΔE of Adhesive Layer>

Figure 7:
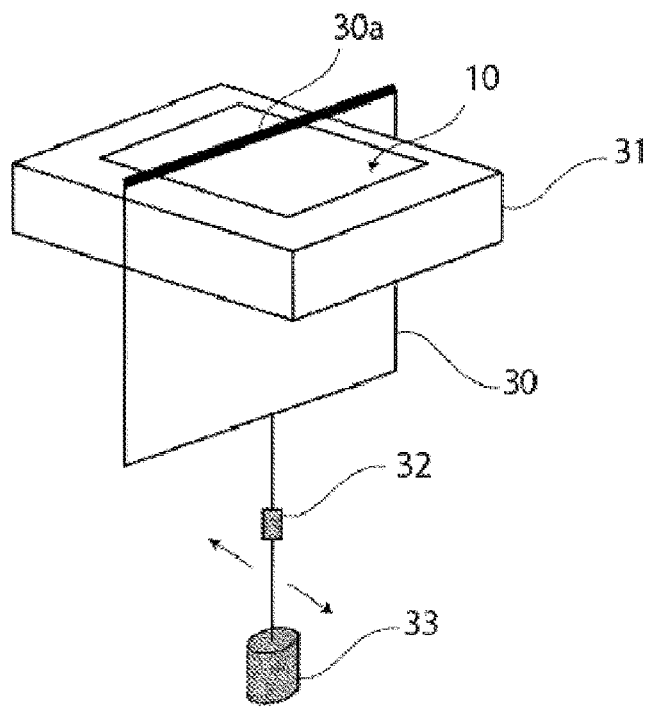
FIG. 7 is a schematic diagram for illustrating a method for measuring a logarithmic decrement ΔE in rigid pendulum measurement.

Each of the obtained power storage device outer packaging materials of Examples 1 to 4 and Comparative Examples 1 and 2 was cut into a rectangle having a width of 15 mm (TD: Transverse Direction) and a length of 150 mm (MD: Machine Direction) to obtain a test sample (power storage device outer packaging material 10). The MD of the power storage device outer packaging material corresponds to the rolling direction (RD) of the aluminum alloy foil, the TD of the power storage device outer packaging material corresponds to the TD of the aluminum alloy foil, and the rolling direction (RD) of the aluminum alloy foil can be determined by rolling streaks. If the MD of the power storage device outer packaging material cannot be identified by the rolling streaks of the aluminum alloy foil, the MD can be identified by the following method. As a method for identifying the MD of the power storage device outer packaging material, a cross-section of the heat-sealable resin layer of the power storage device outer packaging material is observed with an electron microscope to examine a sea-island structure, and a direction parallel to a cross-section having the largest average of diameters of island shapes in a direction perpendicular to the thickness direction of the heat-sealable resin layer can be determined as the MD. Specifically, a cross-section in the length direction of the heat-sealable resin layer and cross-sections (a total of 10 cross-sections) at angular intervals of 10 degrees from a direction parallel to the cross-section in the length direction to a direction perpendicular to the cross-section in the length direction are observed with an electron microscope photograph to examine sea-island structures. Next, in each cross section, the shape of each island is observed. For the shape of each island, the linear distance between the leftmost end in a direction perpendicular to the thickness direction of the heat-sealable resin layer and the rightmost end in the perpendicular direction is defined as a diameter y. In each cross-section, the average of the top 20 diameters y in descending order of the diameter y of the island shape is calculated. The direction parallel to a cross-section having the largest average of the diameters y of the island shapes is determined as MD. FIG. 7 is a schematic diagram for illustrating a method for measuring a logarithmic decrement ΔE by rigid pendulum measurement. A rigid pendulum type physical property tester (model: RPT-3000W manufactured by A&D Company, Limited) was used, FRB-100 was used for a frame of a pendulum 30, RBP-060 was used for a cylindrical cylinder edge 30a of an edge portion, CHB-100 was used for a cold block 31, a vibration displacement detector 32 and a weight 33 were used, and an initial amplitude was 0.3 degrees. The test sample was placed on the cold block 31 in such a manner that the measurement surface (adhesive layer) of the test sample faced upward. The cylindrical cylinder edge 30a with the pendulum 30 was installed on the measurement surface in such a manner that the axial direction of the cylindrical cylinder edge 30a was orthogonal to the MD direction of the test sample. In addition, for preventing floating and warpage of the test sample during measurement, a tape was attached to the test sample at a position having no effect on measurement results, and fixed on the cold block 31. The cylindrical cylinder edge 30a was brought into contact with the surface of the adhesive layer. Next, the logarithmic decrement ΔE of the adhesive layer was measured in a temperature range from 30° C. to 200° C. at a temperature rise rate of 3° C./min using the cold block 31.

A logarithmic decrement ΔE was adopted at which the surface temperature of the adhesive layer of the test sample (power storage device outer packaging material 10) was 120° C. (An average of three measurements (N=3) made by using a unused cut sample rather than using a test sample once measured was used) For the adhesive layer, each of the obtained power storage device outer packaging materials of Examples 1 to 4 and Comparative Examples 1 and 2 was immersed in 15% hydrochloric acid to dissolve the base material layer and the aluminum foil, the test sample including only the adhesive layer and the heat-sealable resin layer was sufficiently dried, and the logarithmic decrement ΔE was measured. Table 1 shows the logarithmic decrements ΔE at 120° C. (The logarithmic decrement ΔE is calculated in accordance with the following expression.

$$\Delta E=[\ln(A1/A2)+\ln(A2/A3)+ \ldots +\ln(An/An+1)]/n$$

A: amplitude n: wavenumber

<Evaluation of Insulation Quality Under Press Pressure>

Preparation of Test Sample

Figure 14:
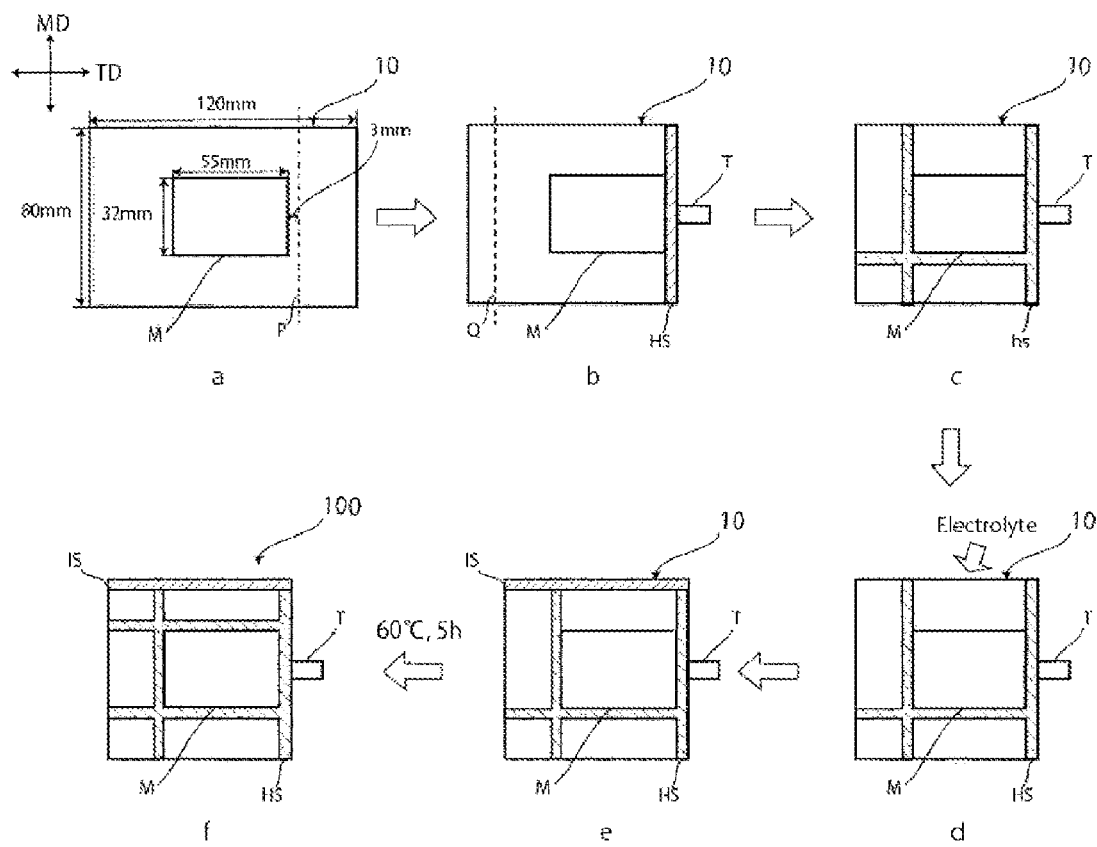
FIG. 14 is a schematic diagram for illustrating a method for preparing a test sample in an example.
Figure 15:
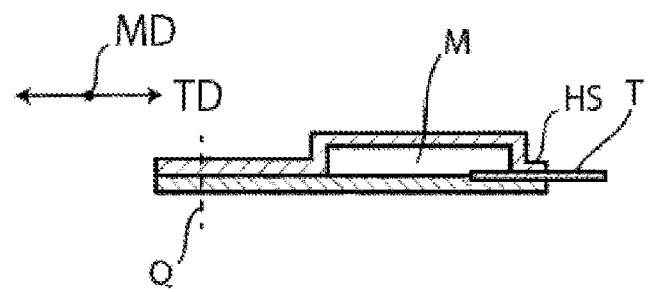
FIG. 15 is a sectional view of the picture shown in FIG. 14b.

A test sample 100 was prepared as shown in the schematic diagrams of FIG. 14 and FIG. 15. Each of the power storage device outer packaging materials 10 obtained in examples and comparative examples was cut into a strip piece having a length of 80 mm (MD) and a width of 120 mm (TD). Two strip pieces were prepared from each of the materials (FIG. 14a). Next, one of the strip pieces was cold-molded with a mold with a size of 32 mm in length and 55 mm in width to form a cup-shaped storage portion M having a depth of 3 mm (FIG. 14a). Here, the position at which the storage portion was formed was a position substantially at the center of the test piece (FIG. 14a). Next, the strip pieces were cut to a width of 3 mm from the storage portion M along one side (MD direction) at which the heat-sealable resin layers were heat-sealed with a metal terminal T interposed therebetween (at a position of the broken line P in FIG. 14a). Next, with nothing in the storage portion M, the two strip pieces (molded one and unmolded one) were superposed in such a manner that the heat-sealable resin layers were on the inner side, and the metal terminal T with an adhesive film for a metal terminal was interposed between the heat-sealable resin layers (FIG. 14b and FIG. 15). In this state, a portion to be heat-sealed was sandwiched between two heat-sealing bars, and the heat-sealable resin layers was heat-sealed (HS in FIG. 14b and FIG. 15). Here, the upper heat seal bar had a width of 7 mm, and the lower heat seal bar had a width of 3 mm. On the lower side, rubber was disposed at a position where the upper heat seal bar did not face the lower heat seal bar. As conditions for heat-sealing, the surface pressure was 2.0 MPa, the temperature was 170° C., and the sealing time was 5 seconds. The metal terminal T was a nickel foil having a thickness of 0.1 mm, a length of 30 mm and a width of 5 mm.

Next, at a distance of 80 mm in the width (TD direction) from one side (MD direction) at which the heat-sealable resin layers were heat-sealed with a metal terminal T interposed therebetween (at a position of the broken line Q in FIG. 14b and FIG. 15), upper and lower power storage device outer packaging materials (molded one and unmolded one) were each cut in the MD direction to align the end parts (the other side in the MD direction). Next, at one side in the TD direction, the strip pieces were vertically sandwiched between two heat-sealing bars (width: 7 mm), and heat-sealed at a temperature of 190° C. for a sealing time of 3 seconds under a pressure reducing the thickness of the heat-sealable resin layer to 80% (FIG. 14c). Further, at the other side in the MD direction where heat-sealing had not been performed (side opposed to one side at which the metal terminal was interposed), the strip pieces were vertically sandwiched between two heat-sealing bars (width: 7 mm), and heat-sealed at a temperature of 190° C. for a sealing time of 3 seconds under a pressure reducing the thickness of the heat-sealable resin layer to 80% (FIG. 14c).

Next, 3 g of an electrolytic solution (solution in which the concentration of lithium hexafluorophosphate is 1 mol/l, and the volume ratio of ethylene carbonate, diethyl carbonate, and dimethyl carbonate is 1:1:1) was injected through an opening on one side in the TD direction (FIG. 14d). Next, in the degassed sealing machine, the one side was impulse-sealed (IS in FIG. 14e) under vacuum to hermetically seal the electrolytic solution (FIG. 14e). Next, this was left to stand in an oven set at 60° C. for 5 hours. Next, this was placed so as to set the impulse-sealed side to the upper side, and vertically sandwiched between two heat-sealing bars (width: 7 mm) at a position on the storage portion side from the position at which impulse sealing had been performed, and heat-sealing was performed at a temperature of 190° C. for a sealing time of 3 seconds under a pressure reducing the thickness of the heat-sealable resin layer to 80%, thereby preparing a test sample 100 having a rectangular shape in plan view (FIG. 14f). For examining the insulation quality of the test sample 100 in this state, a negative terminal of a resistance measuring device was connected to the outer packaging material of the test sample, a metal terminal was connected to a positive terminal, and a voltage of 25V was applied to confirm that the resistance was more than 100 MΩ (see FIG. 17). For the negative electrode, the negative electrode was electrically connected to the barrier layer by sandwiching an alligator clip so as to reach the barrier layer of one of the power storage device outer packaging materials at a position opposite to the storage portion from the position on the test sample where heat-sealing had been performed.

[Evaluation of Insulation Quality]

Figure 16:
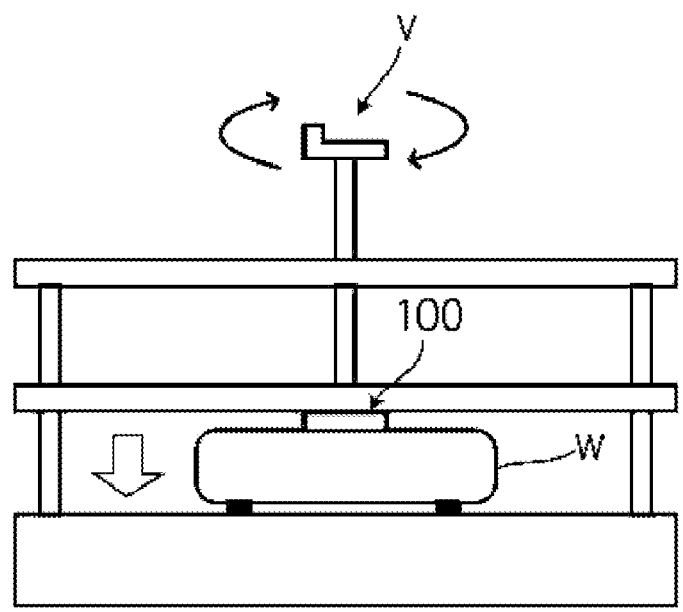
FIG. 16 is a schematic diagram for illustrating a method for evaluating insulation quality in an example.
Figure 17:
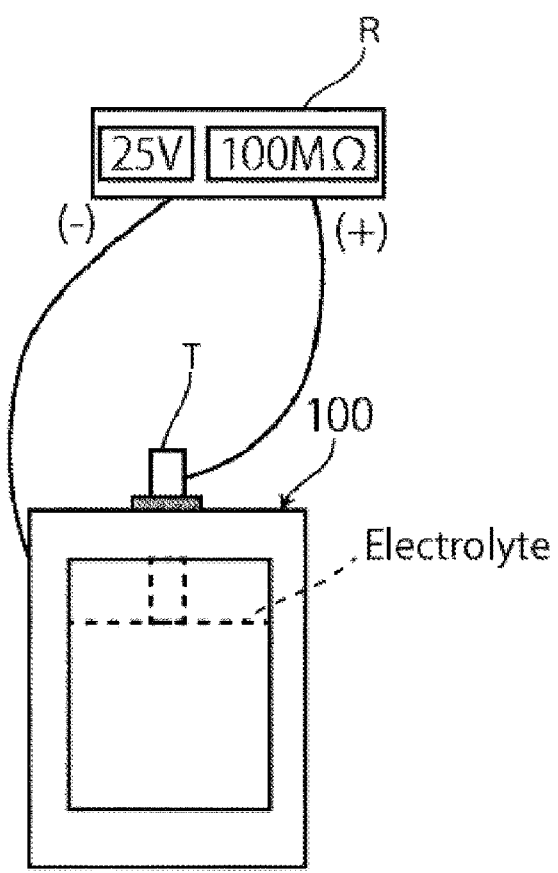
FIG. 17 is a schematic diagram showing a state in which the test sample of FIG. 16 is connected to a resistance measuring device.

As shown in the schematic diagram of FIG. 16, the test sample 100 was placed on a weighing meter in such a manner that the storage portion (protruding portion) of the obtained test sample 100 was on the upper side (FIG. 16). Next, the barrier layer of the test sample was connected to the negative terminal (−) of the resistance measuring device R, the metal terminal was connected to the positive terminal (+), and a voltage of 25V was applied (FIG. 17). In this state, the test sample 100 was pressed from above using a vise V, held for 10 seconds every time the load was increased by 5 kg, and pressed until the load reached 230 kg (FIG. 16). A test sample whose resistance was more than 100 MΩ even when the load reached 230 kg was considered acceptable. The insulation quality was evaluated for each of 10 test samples. Tables 1 and 2 show ratios of test samples considered unacceptable (NG generation rates %) The conditions for the evaluation of insulation quality are severer conditions as compared to the press conditions in production of power storage devices, and even when the NG generation rate is 10%, insulation quality sufficiently acceptable in industrial use can be obtained.

<Observation of Cross-Sectional Structure of Heat-Sealed Portion>

Figure 10:
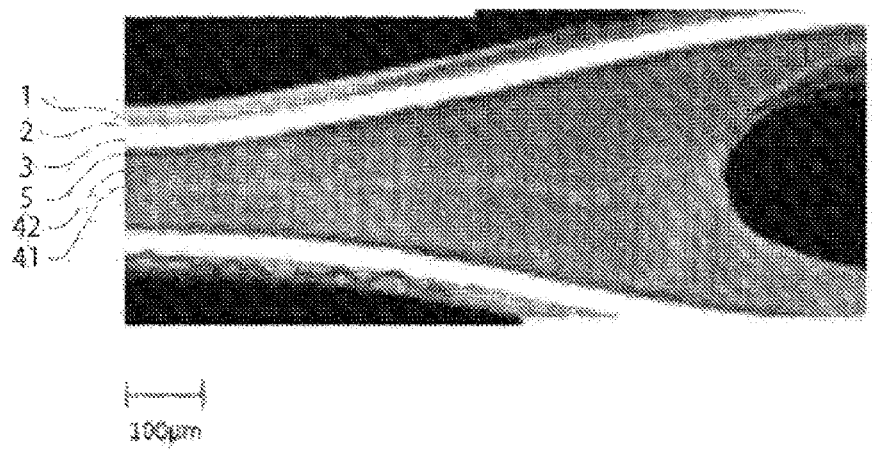
FIG. 10 is a micrograph of a cross-section of a heat-sealed portion between heat-sealable resin layers of the power storage device outer packaging material obtained in Example 1 (photographed at a magnification of 20 times).
Figure 11:
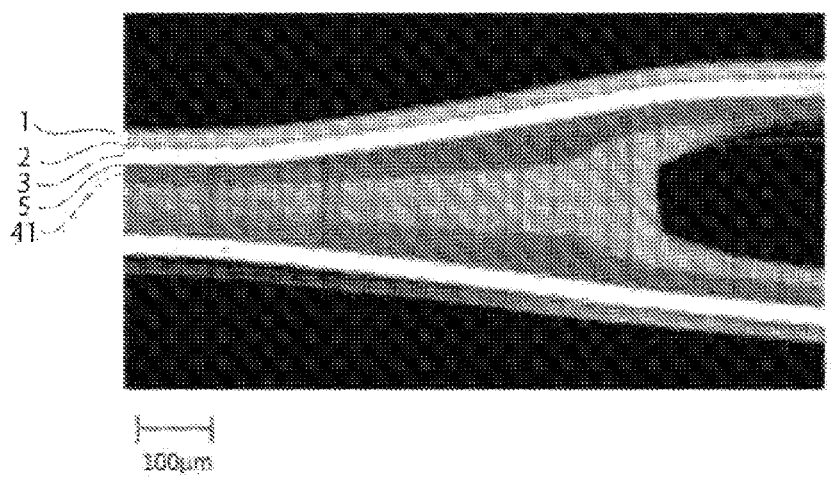
FIG. 11 is a micrograph of a cross-section of a heat-sealed portion between heat-sealable resin layers of the power storage device outer packaging material obtained in Example 2 (photographed at a magnification of 20 times).
Figure 12:
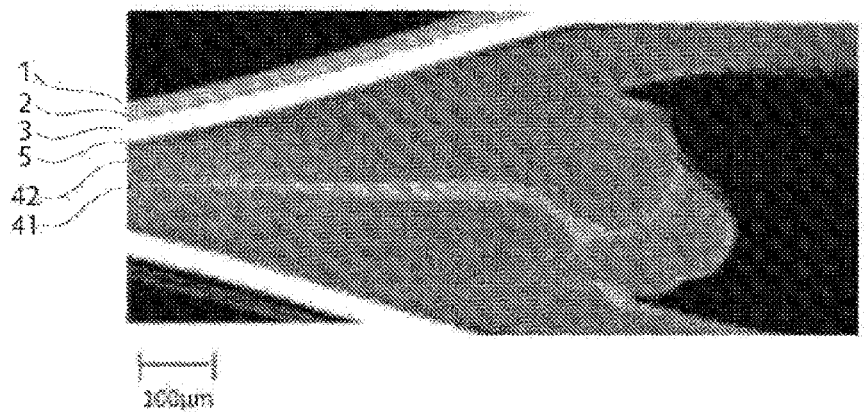
FIG. 12 is a micrograph of a cross-section of a heat-sealed portion between heat-sealable resin layers of the power storage device outer packaging material obtained in Comparative Example 1 (photographed at a magnification of 20 times).

Heat and pressure were applied to each of the power storage device outer packaging materials under conditions of a width of 7 mm, a temperature of 190° C., a pressure of 0.5 MPa and 3 seconds to heat-seal the heat-sealable resin layers, thereby forming the heat-sealed portion. Next, the heat-sealed portion was cut in the thickness direction using a microtome, and the obtained cross-section was observed with a microscope. As the microscope, VK-9710 manufactured by Keyence Corporation was used. For reference, micrographs of cross-sections in Examples 1 and 2 and Comparative Examples 1 are shown in FIG. 10 (Example 1), FIG. 11 (Example 2) and FIG. 12 (Comparative Example 1), respectively. The micrographs of FIG. 10 to FIG. 12 show the positions of the base material layer 1, the adhesive agent layer 2, the barrier layer 3, the adhesive layer 5, the first heat-sealable resin layer 41 and the second heat-sealable resin layer 42.

In addition, on the basis of the micrographs, the cross-sectional structure of the heat-sealed portion was evaluated in accordance with the following criteria. Tables 1 and 2 show the results. The following criteria A and B suggest that crushing in heat-sealing of the first heat-sealable resin layer is effectively suppressed.

A: The heat-sealable resin layer does not protrude to the inner side (the side of a space in which the power storage device outer packaging material is stored) in the heat-sealed portion.

B: The heat-sealable resin layer slightly protrudes to the inner side (the side of a space in which the power storage device outer packaging material is stored) in the heat-sealed portion.

C: The heat-sealable resin layer protrudes to a large extent to the inner side (the side of a space in which the power storage device outer packaging material is stored) in the heat-sealed portion.

From the results shown in Tables 1 and 2, it is apparent that since in Example 1 to 7, the NG generation rate is much lower as compared to Comparative Examples 1 to 6 in the insulation quality test under press pressure, power storage devices using the power storage device outer packaging material of the present invention exhibit high insulation quality even when a press pressure is applied.

<Measurement of Extrapolated Melting Start Temperature and Extrapolated Melting End Temperature in Melting Peak Temperature>

The extrapolated melting start temperature and the extrapolated melting end temperature in the melting peak temperature of the polypropylene used for the first heat-sealable resin layer of each of the power storage device outer packaging materials of Example 2 and Comparative Example 2 were measured by the following method, the temperature differences $T_1$ and $T_2$ between the extrapolated melting start temperature and the extrapolated melting end temperature were measured, and the ratio ($T_2/T_1$) and the absolute value $|T_2-T_1|$ of the difference between these temperature differences were calculated from the values of the obtained temperature differences $T_1$ and $T_2$. Table 3 shows the results.

(Measurement of temperature difference $T_1$)

In accordance with the provision of JIS K7121: 2012, differential scanning calorimetry (DSC) was carried out to obtain a DSC curve for the polypropylene used for the first heat-sealable resin layer of each of the power storage device outer packaging materials of Example 2 and Comparative Example 2. From the obtained DSC curve, the temperature difference $T_1$ between the extrapolated melting start tem-

TABLE 1

| | Thickness (μm) | | | Hardness measured using nanoindenter (MPa) | | Logarithmic decrement of adhesive layer at 120° C. (ΔE) | Insulation quality under press pressure (NG generation rate %) | Cross-sectional structure of heat-sealed portion |
|---|---|---|---|---|---|---|---|---|
| | Adhesive layer | Second heat-sealable layer | First heat-sealable layer | Second heat-sealable layer | First heat-sealable layer | | | |
| Example 1 | 20 | 50 | 10 | 182.2 | 178.9 | 0.12 | 0 | A |
| Example 2 | 40 | — | 40 | — | 178.9 | 0.15 | 10 | A |
| Example 3 | 20 | 50 | 10 | 182.2 | 178.9 | 0.12 | 0 | A |
| Example 4 | 20 | 50 | 10 | 182.2 | 178.9 | 0.12 | 0 | A |
| Comparative Example 1 | 20 | 50 | 10 | 65.5 | 52.6 | 0.23 | 60 | C |
| Comparative Example 2 | 40 | — | 40 | — | 65.5 | 0.23 | 70 | C |
| Comparative Example 3 | 40 | — | 40 | — | 52.6 | — | 80 | C |

TABLE 2

| | Thickness (μm) | | | Hardness measured using nanoindenter (MPa) | | Insulation quality under press pressure (NG generation rate %) | Cross-sectional structure of heat-sealed portion |
|---|---|---|---|---|---|---|---|
| | Adhesive layer | Second heat-sealable layer | First heat-sealable layer | Second heat-sealable layer | First heat-sealable layer | | |
| Example 5 | 20 | 40 | 20 | 182.2 | 178.9 | 0 | A |
| Example 6 | 20 | 45 | 15 | 182.2 | 178.9 | 0 | A |
| Example 7 | 25 | 40 | 15 | 182.2 | 178.9 | 0 | A |
| Comparative Example 4 | 20 | 40 | 20 | 65.5 | 52.6 | 60 | C |
| Comparative Example 5 | 20 | 45 | 15 | 65.5 | 52.6 | 60 | C |
| Comparative Example 6 | 25 | 40 | 15 | 65.5 | 52.6 | 60 | C | perature and the extrapolated melting end temperature in the melting peak temperature of the first heat-sealable resin layer was measured.

(Measurement of temperature difference $T_2$)

In an environment at a temperature of 85° C., the polypropylene used for the first heat-sealable resin layer is left to stand for 72 hours in an electrolytic solution in which the concentration of lithium hexafluorophosphate was 1 mol/l and the volume ratio of ethylene carbonate, diethyl carbonate, and dimethyl carbonate is 1:1:1, and the resin was then sufficiently dried. Next, in accordance with the provision of JIS K7121: 2012, differential scanning calorimetry (DSC) was carried out to obtain a DSC curve for the polypropylene after drying. Next, from the obtained DSC curve, the temperature difference $T_2$ between the extrapolated melting start temperature and the extrapolated melting end temperature in the melting peak temperature of the first heat-sealable resin layer after drying was measured.

In measurement of the extrapolated melting start temperature and the extrapolated melting end temperature in the melting peak temperature, Q200 manufactured by TA Instruments was used. As the DSC curve, the test sample was held at −50° C. for 10 minutes, then heated to 200° C. at a temperature rising rate of 10° C./min (first time), held at 200° C. for 10 minutes, then cooled to −50° C. at a temperature lowering rate of −10° C./min, held at −50° C. for 10 minutes, then heated to 200° C. at a temperature rising rate of 10° C./min (second time), and held at 200° C. for 10 minutes, and a DSC curve in heating of the test sample to 200° C. at the second time was used. In measurement of the temperature difference $T_1$ and the temperature difference $T_2$, a melting peak at which the difference in input of heat energy was the largest among melting peaks appearing in the range of 120 to 160° C. in each DSC curve was analyzed. Even when two or more peaks were present while overlapping one another, only the melting peak at which the difference in the input of heat energy was the largest was analyzed.

The extrapolated melting start temperature means the start point of the melting peak temperature, and was a temperature at an intersection between a straight line obtained by extending the baseline on the low temperature (65 to 75° C.) side to the high temperature side and a tangent line drawn at a point giving the largest gradient and on a curve on the low temperature side of the melting peak at which the difference in input of heat energy was the largest. The extrapolated melting end temperature means the end point of the melting peak temperature, and was a temperature at an intersection between a straight line obtained by extending the baseline on the high temperature (170° C.) side to the low temperature side and a tangent line drawn at a point giving the largest gradient and on a curve on the high temperature side of the melting peak at which the difference in input of heat energy was the largest.

<Measurement of Sealing Strength Before Contact with Electrolytic Solution>

Except that the electrolytic solution was not injected into the test sample in <Measurement of sealing strength after contact with electrolytic solution> below, the same procedure was carried out to measure the tensile strength (sealing strength). The maximum tensile strength until the heat-sealed portion is completely delaminated is defined as sealing strength before contact with the electrolytic solution. In Table 4, the sealing strength before contact with the electrolytic solution is described as sealing strength when the time of contact with the electrolytic solution at 85° C. is 0 h.

<Measurement of Sealing Strength after Contact with Electrolytic Solution>

Figure 6:
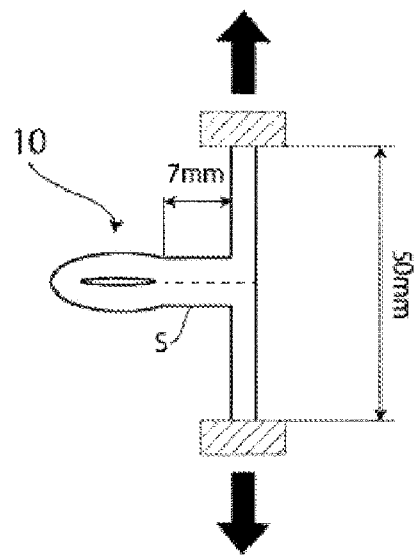
FIG. 6 is a schematic diagram for illustrating a method for measuring the sealing strength.
Figure 8:
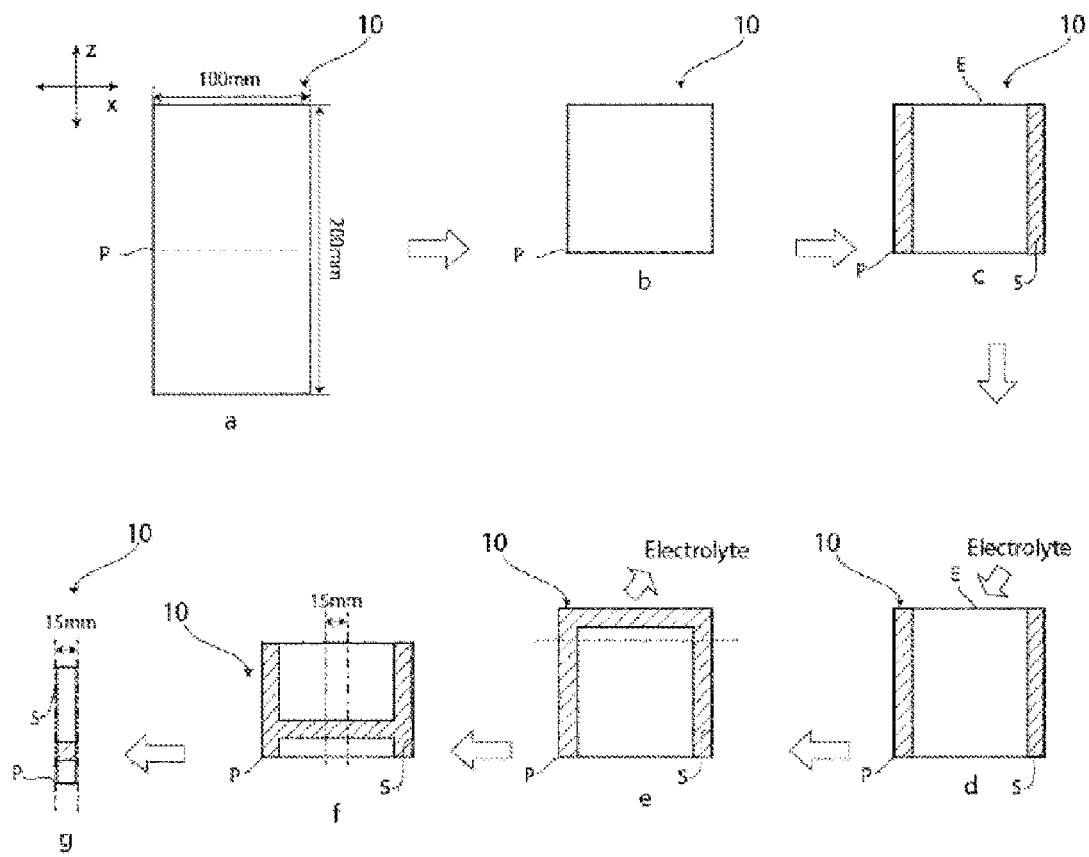
FIG. 8 is a schematic diagram for illustrating a method for measuring the sealing strength.

As shown in the schematic diagram of FIG. 8, each of the obtained power storage device outer packaging materials of Example 2 and Comparative Example 2 was cut into a rectangle having a width of 100 mm (x direction) and a length of 200 mm (z direction) to obtain a test sample (power storage device outer packaging material 10) (FIG. 8*a*). The test sample (power storage device outer packaging material 10) was folded back at the center in the z direction, so that heat-sealable resin layers overlapped each other (FIG. 8*b*). Next, both ends of the folded test sample in the x direction were sealed (temperature: 190° C., surface pressure: 2.0 MPa and time: 3 seconds) by heat-sealing to form test sample into a bag shape having one opening E (FIG. 8*c*). Next, 6 g of an electrolytic solution (solution in which the concentration of lithium hexafluorophosphate is 1 mol/l, and the volume ratio of ethylene carbonate, diethyl carbonate, and dimethyl carbonate is 1:1:1) was injected through an opening E of the test sample formed into a bag shape (FIG. 8*d*), and the end part of the opening E was sealed (temperature: 190° C., surface pressure: 2.0 MPa and time: 3 seconds) by heat-sealing (FIG. 8*e*). Next, the bag-shaped test sample was placed with the folded portion on the lower side, and left to stand in an environment at a temperature of 85° C. for a predetermined storage time (time of contact with electrolytic solution: 0 hours, 24 hours and 72 hours). Next, the end part of the test sample was cut (FIG. 8*e*), and the electrolytic solution was all discharged. Next, with the electrolytic solution deposited on the surface of the heat-sealable resin layer, the upper and lower surfaces of the test sample were sandwiched between metal plates 20 (width: 7 mm), and the heat-sealable resin layers were heat-sealed under the conditions of a temperature of 190° C., a surface pressure of 1.0 MPa and a time of 3 seconds (FIG. 8*f*). Next, the test sample was cut to a width of 15 mm with a double-edged sample cutter so that it was possible to measure the sealing strength at a width of 15 mm (x direction) (FIG. 8*f, g*). Next, the heat-sealed interface was delaminated under the conditions of a tensile speed of 300 mm/min, a delamination angle of 180°, and a chuck-to-chuck distance of 50 mm in an environment at a temperature of 25° C. (AGS-xplus (trade name) manufactured by Shimadzu Corporation) so as to perform T-shaped delamination, and the tensile strength (sealing strength) was measured (FIG. 6). The maximum tensile strength before complete delamination of the heat-sealed portion (the distance before delamination is 7 mm, i.e. the width of the metal plate) was defined as the sealing strength after contact with the electrolytic solution.

Table 4 shows retention rates (%) of the sealing strength after contact with the electrolytic solution based on the sealing strength before contact with the electrolytic solution (100%).

TABLE 3

| | Contact with electrolytic solution at 85° C. | Melting peak temperature | | | | |
|---|---|---|---|---|---|---|
| | | Start point (° C.) | End point (° C.) | Temperature difference between start point and end point (° C.) | Ratio $T_2/T_1$ | Absolute value of difference $|T_2 - T_1|$ |
| Example 2 | Before | 126.3 | 161.0 | $T_1 = 34.7$ | 0.79 | 7.2 |
| | After | 128.1 | 155.6 | $T_2 = 27.5$ | | |
| Comparative Example 2 | Before | 126.9 | 157.5 | $T_1 = 30.6$ | 0.59 | 12.6 |
| | After | 131.4 | 149.4 | $T_2 = 18.0$ | | |

TABLE 4

| | | Time of contact with electrolytic solution at 85° C. | | |
|---|---|---|---|---|
| | | 0 h | 24 h | 72 h |
| Example 2 | Sealing strength (N/15 mm) | 140 | 140 | 140 |
| | Retention rate (%) | 100 | 100 | 100 |
| Comparative Example 2 | Sealing strength (N/15 mm) | 132 | 107 | 82 |
| | Retention rate (%) | 100 | 81 | 62 |

From the results shown in Tables 3 and 4, it is apparent that in the power storage device outer packaging material of Example 2, the value obtained by dividing the temperature difference $T_2$ by the temperature difference $T_1$ is 0.60 or more, and thus high sealing strength is exhibited by heat-sealing even if the first heat-sealable resin layer is heat-sealed with the electrolytic solution deposited on the first heat-sealable resin layer by contact of the electrolytic solution with the first heat-sealable resin layer in a high-temperature environment.

As described above, the present disclosure provides the invention of aspects as shown below.

Item 1. A power storage device outer packaging material which includes a laminate including at least a base material layer, a barrier layer and a heat-sealable resin layer in this order,
the heat-sealable resin layer including a single layer or multiple layers,
the heat-sealable resin layer including at least one layer having a hardness of 70 MPa or more as measured from a cross-section in a lamination direction of the laminate under a load of indentation of 100 μN in a nanoindentation method.

Item 2. The power storage device outer packaging material according to any one of item 1, further including an adhesive layer between the barrier layer and the heat-sealable resin layer.

Item 3. The power storage device outer packaging material according to item 2, in which the thickness of a layer having a hardness of 70 MPa or more and the largest thickness in the heat-sealable resin layer is larger than the thickness of the adhesive layer.

Item 4. The power storage device outer packaging material according to item 2 or 3, in which the adhesive layer is formed of a thermoplastic resin.

Item 5. The power storage device outer packaging material according to any one of items 2 to 4, in which the adhesive layer has a logarithmic decrement ΔE of 0.22 or less at 120° C. in rigid pendulum measurement.

Item 6. The power storage device outer packaging material according to any one of items 2 to 5, in which the heat-sealable resin layer includes a first heat-sealable resin layer and a second heat-sealable resin layer in this order from the surface side of the laminate, and the thickness of the second heat-sealable resin layer is larger than the thickness of the adhesive layer.

Item 7. The power storage device outer packaging material according to any one of items 1 to 5, in which the heat-sealable resin layer includes a first heat-sealable resin layer and a second heat-sealable resin layer in this order from the surface side of the laminate, and the thickness of the second heat-sealable resin layer is larger than the thickness of the first heat-sealable resin layer.

Item 8. The power storage device outer packaging material according to any one of items 1 to 5, in which the heat-sealable resin layer includes a first heat-sealable resin layer and a second heat-sealable resin layer in this order from the surface side of the laminate, and the first heat-sealable resin layer and the second heat-sealable resin layer are formed of different resins.

Item 9. The power storage device outer packaging material according to any one of items 5 to 8, in which
the adhesive layer is provided between the barrier layer and the heat-sealable resin layer,
the heat-sealable resin layer includes a first heat-sealable resin layer and a second heat-sealable resin layer in this order from the surface side of the laminate, and
the adhesive layer, the first heat-sealable resin layer and the second heat-sealable resin layer are co-extruded resin layers.

Item 10. The power storage device outer packaging material according to any one of items 1 to 9, in which the heat-sealable resin layer includes the first heat-sealable resin layer forming a surface of the laminate, and a value obtained by measuring a temperature difference $T_1$ and a temperature difference $T_2$ in the first heat-sealable resin layer by the following method and dividing the temperature difference $T_2$ by the temperature difference $T_1$ is 0.60 or more:

(Measurement of temperature difference $T_1$)
the temperature difference $T_1$ between an extrapolated melting start temperature and an extrapolated melting end temperature in the melting peak temperature of the first heat-sealable resin layer is measured by differential scanning calorimetry; and (Measurement of temperature difference $T_2$)
the first heat-sealable resin layer is left to stand for 72 hours in an electrolytic solution in which the concentration of lithium hexafluorophosphate is 1 mol/l and the volume ratio of ethylene carbonate, diethyl carbonate, and dimethyl carbonate is 1:1:1 and the resin is then sufficiently dried in an environment at a temperature of 85° C., and the temperature difference $T_2$ between an extrapolated melting start temperature and an extrapolated melting end temperature in the melting peak temperature of the first heat-sealable resin layer after drying is measured by differential scanning calorimetry.

Item 11. The power storage device outer packaging material according to any one of items 6 to 9, in which a lubricant is present on a surface of the first heat-sealable resin layer.

Item 12. A method for producing a power storage device outer packaging material, including the step of laminating at least a base material layer, a barrier layer and a heat-sealable resin layer in this order to obtain a laminate, the heat-sealable resin layer including a single layer or multiple layers, the heat-sealable resin layer including at least one layer having a hardness of 70 MPa or more as measured from a cross-section in a lamination direction of the laminate under a load of indentation of 100 μN in a nanoindentation method.

Item 13. A power storage device in which a power storage device element including at least a positive electrode, a negative electrode and an electrolyte is stored in a packaging formed of the power storage device outer packaging material according to any one of items 1 to 11.

DESCRIPTION OF REFERENCE SIGNS

1: Base material layer
2: Adhesive agent layer
3: Barrier layer
4: Heat-sealable resin layer
5: Adhesive layer
6: Surface coating layer
10: Power storage device outer packaging material
41: First heat-sealable resin layer
42: Second heat-sealable resin layer

The invention claimed is:

1. A power storage device outer packaging material which comprises a laminate including at least a base material layer, a barrier layer and a heat-sealable resin layer in this order,
the heat-sealable resin layer including a single layer or multiple layers,
the heat-sealable resin layer including at least one layer having a hardness of 70 MPa or more as measured from a cross-section in a lamination direction of the laminate under a load of indentation of 100 μN in a nanoindentation method.

2. The power storage device outer packaging material according to claim 1, further comprising an adhesive layer between the barrier layer and the heat-sealable resin layer.

3. The power storage device outer packaging material according to claim 2, wherein the thickness of a layer having a hardness of 70 MPa or more and the largest thickness in the heat-sealable resin layer is larger than the thickness of the adhesive layer.

4. The power storage device outer packaging material according to claim 2, wherein the adhesive layer is formed of a thermoplastic resin.

5. The power storage device outer packaging material according to claim 2, wherein the adhesive layer has a logarithmic decrement ΔE of 0.22 or less at 120° ° C. in rigid pendulum measurement.

6. The power storage device outer packaging material according to claim 2, wherein the heat-sealable resin layer includes a first heat-sealable resin layer and a second heat-sealable resin layer in this order from the surface side of the laminate, and the thickness of the second heat-sealable resin layer is larger than the thickness of the adhesive layer.

7. The power storage device outer packaging material according to claim 1, wherein the heat-sealable resin layer includes a first heat-sealable resin layer and a second heat-sealable resin layer in this order from the surface side of the laminate, and the thickness of the second heat-sealable resin layer is larger than the thickness of the first heat-sealable resin layer.

8. The power storage device outer packaging material according to claim 1, wherein the heat-sealable resin layer includes a first heat-sealable resin layer and a second heat-sealable resin layer in this order from the surface side of the laminate, and the first heat-sealable resin layer and the second heat-sealable resin layer are formed of different resins.

9. The power storage device outer packaging material according to claim 1, wherein
the adhesive layer is provided between the barrier layer and the heat-sealable resin layer,
the heat-sealable resin layer includes a first heat-sealable resin layer and a second heat-sealable resin layer in this order from the surface side of the laminate, and
the adhesive layer, the first heat-sealable resin layer and the second heat-sealable resin layer are co-extruded resin layers.

10. The power storage device outer packaging material according to claim 1, wherein the heat-sealable resin layer includes the first heat-sealable resin layer forming a surface of the laminate, and a value obtained by measuring a temperature difference $T_1$ and a temperature difference $T_2$ in the first heat-sealable resin layer by the following method and dividing the temperature difference $T_2$ by the temperature difference $T_1$ is 0.60 or more:

(measurement of temperature difference $T_1$)
the temperature difference $T_1$ between an extrapolated melting start temperature and an extrapolated melting end temperature in the melting peak temperature of the first heat-sealable resin layer is measured by differential scanning calorimetry; and (measurement of temperature difference $T_2$)
the first heat-sealable resin layer is left to stand for 72 hours in an electrolytic solution in which the concentration of lithium hexafluorophosphate is 1 mol/l and the volume ratio of ethylene carbonate, diethyl carbonate, and dimethyl carbonate is 1:1:1 and the resin is then sufficiently dried in an environment at a temperature of 85° C., and the temperature difference $T_2$ between an extrapolated melting start temperature and an extrapolated melting end temperature in the melting peak temperature of the first heat-sealable resin layer after drying is measured by differential scanning calorimetry.

11. The power storage device outer packaging material according to claim 6, wherein a lubricant is present on a surface of the first heat-sealable resin layer.

12. A method for producing a power storage device outer packaging material, comprising the step of laminating at least a base material layer, a barrier layer and a heat-sealable resin layer in this order to obtain a laminate,
the heat-sealable resin layer including a single layer or multiple layers,
the heat-sealable resin layer including at least one layer having a hardness of 70 MPa or more as measured from a cross-section in a lamination direction of the laminate under a load of indentation of 100 μN in a nanoindentation method.

13. A power storage device in which a power storage device element including at least a positive electrode, a negative electrode and an electrolyte is stored in a packaging formed of the power storage device outer packaging material according to claim 1.

* * * * *